United States Patent
Bollinger et al.

(10) Patent No.: US 8,763,390 B2
(45) Date of Patent: Jul. 1, 2014

(54) HEAT EXCHANGE WITH COMPRESSED GAS IN ENERGY-STORAGE SYSTEMS

(75) Inventors: Benjamin R. Bollinger, Windsor, VT (US); Troy O. McBride, Norwich, VT (US); Benjamin Cameron, Hanover, NH (US); Patrick Magari, Plainfield, NH (US); Michael Izenson, Hanover, NH (US); Weibo Chen, Hanover, NH (US)

(73) Assignee: SustainX, Inc., Seabrook, NH (US)

( * ) Notice: Subject to any disclaimer, the term of this patent is extended or adjusted under 35 U.S.C. 154(b) by 0 days.

(21) Appl. No.: 13/564,430

(22) Filed: Aug. 1, 2012

(65) Prior Publication Data
US 2012/0297776 A1 Nov. 29, 2012

Related U.S. Application Data

(63) Continuation of application No. 13/094,960, filed on Apr. 27, 2011, now Pat. No. 8,250,863, which is a continuation-in-part of application No. 12/690,513, filed on Jan. 20, 2010, now Pat. No. 7,958,731, and a continuation-in-part of application No. 12/639,703,
(Continued)

(51) Int. Cl.
*F01K 21/04* (2006.01)
*F15B 21/04* (2006.01)

(52) U.S. Cl.
USPC ............... 60/511; 60/512; 60/515; 91/4 R; 91/4 A

(58) Field of Classification Search
USPC ............... 60/508–515; 91/4 R, 4 A
See application file for complete search history.

(56) References Cited

U.S. PATENT DOCUMENTS

| 114,297 A | 5/1871 | Ivens et al. |
| 224,081 A | 2/1880 | Eckart |

(Continued)

FOREIGN PATENT DOCUMENTS

| BE | 898225 | 3/1984 |
| BE | 1008885 | 8/1996 |

(Continued)

OTHER PUBLICATIONS

"Hydraulic Transformer Supplies Continuous High Pressure," Machine Design, Penton Media, vol. 64, No. 17, (Aug. 1992), 1 page.
(Continued)

*Primary Examiner* — Hoang Nguyen
(74) *Attorney, Agent, or Firm* — Occhiuti & Rohlicek LLP

(57) ABSTRACT

In various embodiments, compressed-gas energy storage and recovery systems include a cylinder assembly for compression and/or expansion of gas, a reservoir for storage and/or supply of compressed gas, and a system for thermally conditioning gas within the reservoir.

15 Claims, 9 Drawing Sheets

Related U.S. Application Data filed on Dec. 16, 2009, now Pat. No. 8,225,606, which is a continuation-in-part of application No. 12/421,057, filed on Apr. 9, 2009, now Pat. No. 7,832,207, and a continuation-in-part of application No. 12/481,235, filed on Jun. 9, 2009, now Pat. No. 7,802,426.

(60) Provisional application No. 61/328,408, filed on Apr. 27, 2010, provisional application No. 61/145,860, filed on Jan. 20, 2009, provisional application No. 61/145,864, filed on Jan. 20, 2009, provisional application No. 61/146,432, filed on Jan. 22, 2009, provisional application No. 61/148,481, filed on Jan. 30, 2009, provisional application No. 61/151,332, filed on Feb. 10, 2009, provisional application No. 61/227,222, filed on Jul. 21, 2009, provisional application No. 61/256,576, filed on Oct. 30, 2009, provisional application No. 61/264,317, filed on Nov. 25, 2009, provisional application No. 61/266,758, filed on Dec. 4, 2009, provisional application No. 61/148,691, filed on Jan. 30, 2009, provisional application No. 61/043,630, filed on Apr. 9, 2008, provisional application No. 61/059,964, filed on Jun. 9, 2008, provisional application No. 61/166,448, filed on Apr. 3, 2009, provisional application No. 61/184,166, filed on Jun. 4, 2009, provisional application No. 61/223,564, filed on Jul. 7, 2009, provisional application No. 61/227,222, filed on Jul. 21, 2009, provisional application No. 61/251,965, filed on Oct. 15, 2009.

(56) References Cited

U.S. PATENT DOCUMENTS

| | | | |
|---|---|---|---|
| 233,432 | A | 10/1880 | Pitchford |
| 1,353,216 | A | 9/1920 | Carlson |
| 1,635,524 | A | 7/1927 | Aikman |
| 2,141,703 | A | 12/1938 | Bays |
| 2,280,100 | A | 4/1942 | SinQleton |
| 2,280,845 | A | 4/1942 | Parker |
| 2,404,660 | A | 7/1946 | Rouleau |
| 2,420,098 | A | 5/1947 | Rouleau |
| 2,486,081 | A | 10/1949 | Weenen |
| 2,539,862 | A | 1/1951 | Rushing |
| 2,628,564 | A | 2/1953 | Jacobs |
| 2,632,995 | A | 3/1953 | Noe |
| 2,712,728 | A | 7/1955 | Lewis et al. |
| 2,813,398 | A | 11/1957 | Wilcox |
| 2,829,501 | A | 4/1958 | Walls |
| 2,880,759 | A | 4/1959 | Wisman |
| 3,041,842 | A | 7/1962 | Heinecke |
| 3,100,965 | A | 8/1963 | Blackburn |
| 3,192,705 | A * | 7/1965 | Miller .................. 60/511 |
| 3,236,512 | A | 2/1966 | Caslav et al. |
| 3,237,847 | A * | 3/1966 | Forbes .................. 417/53 |
| 3,269,121 | A | 8/1966 | Ludwig |
| 3,538,340 | A | 11/1970 | LanQ |
| 3,608,311 | A | 9/1971 | Roesel, Jr. |
| 3,648,458 | A | 3/1972 | McAlister |
| 3,650,636 | A | 3/1972 | Eskeli |
| 3,672,160 | A | 6/1972 | Kim |
| 3,677,008 | A | 7/1972 | Koutz |
| 3,704,079 | A | 11/1972 | Berlyn |
| 3,750,391 | A * | 8/1973 | Roblyer .................. 60/384 |
| 3,757,517 | A | 9/1973 | RiQollot |
| 3,793,848 | A | 2/1974 | Eskeli |
| 3,801,793 | A | 4/1974 | Goebel |
| 3,803,847 | A | 4/1974 | McAlister |
| 3,839,863 | A | 10/1974 | Frazier |
| 3,847,182 | A | 11/1974 | Greer |
| 3,895,493 | A | 7/1975 | Riqollot |
| 3,903,696 | A | 9/1975 | Carman |
| 3,935,469 | A | 1/1976 | Haydock |
| 3,939,356 | A | 2/1976 | Loane |
| 3,942,323 | A | 3/1976 | Maillet |
| 3,945,207 | A | 3/1976 | Hyatt |
| 3,948,049 | A | 4/1976 | Ohms et al. |
| 3,952,516 | A | 4/1976 | Lapp |
| 3,952,723 | A | 4/1976 | Browning |
| 3,958,899 | A | 5/1976 | Coleman, Jr. et al. |
| 3,986,354 | A | 10/1976 | Erb |
| 3,988,592 | A | 10/1976 | Porter |
| 3,988,897 | A | 11/1976 | Strub |
| 3,990,246 | A | 11/1976 | Wilmers |
| 3,991,574 | A | 11/1976 | Frazier |
| 3,996,741 | A | 12/1976 | HerberQ |
| 3,998,049 | A | 12/1976 | McKinley et al. |
| 3,999,388 | A | 12/1976 | Nystrom |
| 4,008,006 | A | 2/1977 | Bea |
| 4,027,993 | A | 6/1977 | Wolff |
| 4,030,303 | A | 6/1977 | Kraus et al. |
| 4,031,702 | A | 6/1977 | Burnett et al. |
| 4,031,704 | A | 6/1977 | Moore et al. |
| 4,041,708 | A | 8/1977 | Wolff |
| 4,050,246 | A | 9/1977 | Bourquardez |
| 4,055,950 | A | 11/1977 | Grossman |
| 4,055,951 | A * | 11/1977 | Davoud et al. .................. 60/514 |
| 4,058,979 | A | 11/1977 | Germain |
| 4,075,844 | A | 2/1978 | Schiferli |
| 4,089,744 | A | 5/1978 | Cahn |
| 4,094,356 | A | 6/1978 | Ash et al. |
| 4,095,118 | A | 6/1978 | Rathbun |
| 4,100,745 | A | 7/1978 | Gyarmathy et al. |
| 4,104,955 | A | 8/1978 | Murphy |
| 4,108,077 | A | 8/1978 | Laing |
| 4,109,465 | A | 8/1978 | Plen |
| 4,110,987 | A | 9/1978 | Cahn et al. |
| 4,112,311 | A | 9/1978 | Theyse |
| 4,117,342 | A | 9/1978 | Melley, Jr. |
| 4,117,696 | A | 10/1978 | Fawcett et al. |
| 4,118,637 | A | 10/1978 | Tackett |
| 4,124,182 | A | 11/1978 | Loeb |
| 4,126,000 | A | 11/1978 | Funk |
| 4,136,432 | A | 1/1979 | Melley, Jr. |
| 4,142,368 | A | 3/1979 | Mantegani |
| 4,147,204 | A | 4/1979 | Pfenninger |
| 4,149,092 | A | 4/1979 | Cros |
| 4,150,547 | A | 4/1979 | Hobson |
| 4,154,292 | A | 5/1979 | Herrick |
| 4,167,372 | A | 9/1979 | Tackett |
| 4,170,878 | A | 10/1979 | Jahniq |
| 4,173,431 | A | 11/1979 | Smith |
| 4,189,925 | A | 2/1980 | Long |
| 4,194,889 | A | 3/1980 | Wanner |
| 4,195,481 | A | 4/1980 | Gregory |
| 4,197,700 | A | 4/1980 | Jahniq |
| 4,197,715 | A | 4/1980 | Fawcett et al. |
| 4,201,514 | A | 5/1980 | Huetter |
| 4,204,126 | A | 5/1980 | Diggs |
| 4,206,608 | A | 6/1980 | Bell |
| 4,209,982 | A | 7/1980 | Pitts |
| 4,220,006 | A | 9/1980 | Kindt |
| 4,229,143 | A | 10/1980 | Pucher |
| 4,229,661 | A | 10/1980 | Mead et al. |
| 4,232,253 | A | 11/1980 | Mortelmans |
| 4,237,692 | A | 12/1980 | Ahrens et al. |
| 4,242,878 | A | 1/1981 | Brinkerhoff |
| 4,246,978 | A | 1/1981 | Schulz et al. |
| 4,262,735 | A | 4/1981 | Courrege |
| 4,273,514 | A | 6/1981 | Shore et al. |
| 4,274,010 | A | 6/1981 | Lawson-tancred |
| 4,275,310 | A | 6/1981 | Summers et al. |
| 4,281,256 | A | 7/1981 | Ahrens |
| 4,293,323 | A | 10/1981 | Cohen |
| 4,299,198 | A | 11/1981 | Woodhull |
| 4,302,684 | A | 11/1981 | Gogins |
| 4,304,103 | A | 12/1981 | Hamrick |
| 4,311,011 | A | 1/1982 | Lewis |

(56) References Cited

U.S. PATENT DOCUMENTS

| | | |
|---|---|---|
| 4,316,096 A | 2/1982 | Syverson |
| 4,317,439 A | 3/1982 | Emmerling |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,380,419 A | 4/1983 | Morton |
| 4,392,062 A | 7/1983 | Bervig |
| 4,393,752 A | 7/1983 | Meier |
| 4,411,136 A | 10/1983 | Funk |
| 4,416,114 A | 11/1983 | Martini |
| 4,421,661 A | 12/1983 | Claar et al. |
| 4,428,711 A | 1/1984 | Archer |
| 4,435,131 A | 3/1984 | Ruben |
| 4,444,011 A | 4/1984 | Kolin |
| 4,446,698 A | 5/1984 | Benson |
| 4,447,738 A | 5/1984 | Allison |
| 4,449,372 A | 5/1984 | Rilett |
| 4,452,046 A | 6/1984 | Valentin |
| 4,452,047 A | 6/1984 | Hunt et al. |
| 4,454,429 A | 6/1984 | Buonome |
| 4,454,720 A | 6/1984 | Leibowitz |
| 4,455,834 A | 6/1984 | Earle |
| 4,462,213 A | 7/1984 | Lewis |
| 4,474,002 A | 10/1984 | Perry |
| 4,476,851 A | 10/1984 | Brugger et al. |
| 4,478,553 A | 10/1984 | Leibowitz et al. |
| 4,489,554 A | 12/1984 | Otters |
| 4,491,739 A | 1/1985 | Watson |
| 4,492,539 A | 1/1985 | Specht |
| 4,493,189 A | 1/1985 | Slater |
| 4,496,847 A | 1/1985 | Parkins |
| 4,498,848 A | 2/1985 | Petrovsky et al. |
| 4,502,284 A | 3/1985 | Chrisoqhilos |
| 4,503,673 A | 3/1985 | Schachle |
| 4,514,979 A * | 5/1985 | Mohr .............................. 60/512 |
| 4,515,516 A | 5/1985 | Perrine et al. |
| 4,520,840 A | 6/1985 | Michel |
| 4,525,631 A | 6/1985 | Allison |
| 4,530,208 A | 7/1985 | Sato |
| 4,547,209 A | 10/1985 | Netzer |
| 4,574,592 A | 3/1986 | Eskeli |
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |
| 4,671,742 A | 6/1987 | Gyimesi |
| 4,676,068 A | 6/1987 | Funk |
| 4,679,396 A | 7/1987 | Heggie |
| 4,691,524 A | 9/1987 | Holscher |
| 4,693,080 A | 9/1987 | Van Hooff |
| 4,706,456 A | 11/1987 | Backe |
| 4,707,988 A | 11/1987 | Palmers |
| 4,710,100 A | 12/1987 | Laing et al. |
| 4,735,552 A | 4/1988 | Watson |
| 4,739,620 A | 4/1988 | Pierce |
| 4,760,697 A | 8/1988 | Heggie |
| 4,761,118 A | 8/1988 | Zanarini |
| 4,765,142 A | 8/1988 | Nakhamkin |
| 4,765,143 A | 8/1988 | Crawford et al. |
| 4,767,938 A | 8/1988 | Bervig |
| 4,792,700 A | 12/1988 | Ammons |
| 4,849,648 A | 7/1989 | Longardner |
| 4,870,816 A | 10/1989 | Nakhamkin |
| 4,872,307 A | 10/1989 | Nakhamkin |
| 4,873,828 A | 10/1989 | Laing et al. |
| 4,873,831 A | 10/1989 | Dehne |
| 4,876,992 A | 10/1989 | Sobotowski |
| 4,877,530 A | 10/1989 | Moses |
| 4,885,912 A | 12/1989 | Nakhamkin |
| 4,886,534 A | 12/1989 | Castan |
| 4,907,495 A | 3/1990 | Sugahara |
| 4,936,109 A | 6/1990 | Longardner |
| 4,942,736 A | 7/1990 | Bronicki |
| 4,947,977 A | 8/1990 | Raymond |
| 4,955,195 A | 9/1990 | Jones et al. |
| 4,984,432 A | 1/1991 | Corey |
| 5,056,601 A | 10/1991 | Grimmer |
| 5,058,385 A | 10/1991 | Everett, Jr. |
| 5,062,498 A | 11/1991 | Tobias |
| 5,107,681 A | 4/1992 | Wolfbauer, III |
| 5,133,190 A | 7/1992 | Abdelmalek |
| 5,138,838 A | 8/1992 | Crosser |
| 5,140,170 A | 8/1992 | Henderson |
| 5,152,260 A | 10/1992 | Erickson et al. |
| 5,161,449 A | 11/1992 | Everett, Jr. |
| 5,169,295 A | 12/1992 | Stogner et al. |
| 5,182,086 A | 1/1993 | Henderson et al. |
| 5,203,168 A | 4/1993 | Oshina |
| 5,209,063 A | 5/1993 | Shirai et al. |
| 5,213,470 A | 5/1993 | Lundquist |
| 5,239,833 A | 8/1993 | Fineblum |
| 5,259,345 A | 11/1993 | Richeson |
| 5,271,225 A | 12/1993 | Adamides |
| 5,279,206 A | 1/1994 | Krantz |
| 5,296,799 A | 3/1994 | Davis |
| 5,309,713 A | 5/1994 | Vassallo |
| 5,321,946 A | 6/1994 | Abdelmalek |
| 5,327,987 A | 7/1994 | Abdelmalek |
| 5,339,633 A | 8/1994 | Fujii et al. |
| 5,341,644 A | 8/1994 | Nelson |
| 5,344,627 A | 9/1994 | Fujii et al. |
| 5,364,611 A | 11/1994 | Iijima et al. |
| 5,365,980 A | 11/1994 | Deberardinis |
| 5,375,417 A | 12/1994 | Barth |
| 5,379,589 A | 1/1995 | Cohn et al. |
| 5,384,489 A | 1/1995 | Bellac |
| 5,387,089 A | 2/1995 | Stogner et al. |
| 5,394,693 A | 3/1995 | Plyter |
| 5,427,194 A | 6/1995 | Miller |
| 5,436,508 A | 7/1995 | Sorensen |
| 5,439,829 A * | 8/1995 | Anderson et al. ............. 436/518 |
| 5,448,889 A | 9/1995 | Bronicki |
| 5,454,408 A | 10/1995 | Dibella et al. |
| 5,454,426 A | 10/1995 | Moseley |
| 5,467,722 A | 11/1995 | Meratla |
| 5,477,677 A | 12/1995 | Krnavek |
| 5,491,969 A | 2/1996 | Cohn et al. |
| 5,491,977 A | 2/1996 | Cho |
| 5,524,821 A | 6/1996 | Yie et al. |
| 5,537,822 A | 7/1996 | Shnaid et al. |
| 5,544,698 A | 8/1996 | Paulman |
| 5,557,934 A | 9/1996 | Beach |
| 5,561,978 A | 10/1996 | Buschur |
| 5,562,010 A | 10/1996 | McGuire |
| 5,579,640 A | 12/1996 | Gray, Jr. et al. |
| 5,584,664 A | 12/1996 | Elliott et al. |
| 5,592,028 A | 1/1997 | Pritchard |
| 5,595,587 A | 1/1997 | Steed |
| 5,598,736 A | 2/1997 | Erskine |
| 5,599,172 A | 2/1997 | Mccabe |
| 5,600,953 A | 2/1997 | Oshita et al. |
| 5,616,007 A | 4/1997 | Cohen |
| 5,634,340 A | 6/1997 | Grennan |
| 5,641,273 A | 6/1997 | Moseley |
| 5,674,053 A | 10/1997 | Paul et al. |
| 5,685,154 A | 11/1997 | Bronicki et al. |
| 5,685,155 A | 11/1997 | Brown |
| 5,768,893 A | 6/1998 | Hoshino et al. |
| 5,769,610 A | 6/1998 | Paul et al. |

(56) References Cited

U.S. PATENT DOCUMENTS

| | | |
|---|---|---|
| 5,771,693 A | 6/1998 | Coney |
| 5,775,107 A | 7/1998 | Sparkman |
| 5,778,675 A | 7/1998 | Nakhamkin |
| 5,794,442 A | 8/1998 | Lisniansky |
| 5,797,980 A | 8/1998 | Fillet |
| 5,819,533 A | 10/1998 | Moonen |
| 5,819,635 A | 10/1998 | Moonen |
| 5,831,757 A | 11/1998 | DiFrancesco |
| 5,832,728 A | 11/1998 | Buck |
| 5,832,906 A | 11/1998 | Douville et al. |
| 5,839,270 A | 11/1998 | Jirnov et al. |
| 5,845,479 A | 12/1998 | Nakhamkin |
| 5,873,250 A | 2/1999 | Lewis |
| 5,901,809 A | 5/1999 | Berkun |
| 5,924,283 A | 7/1999 | Burke, Jr. |
| 5,934,063 A | 8/1999 | Nakhamkin |
| 5,934,076 A | 8/1999 | Coney |
| 5,937,652 A | 8/1999 | Abdelmalek |
| 5,971,027 A | 10/1999 | Beachley et al. |
| 6,012,279 A | 1/2000 | Hines |
| 6,023,105 A | 2/2000 | Youssef |
| 6,026,349 A | 2/2000 | Heneman |
| 6,029,445 A | 2/2000 | Lech |
| 6,073,445 A | 6/2000 | Johnson |
| 6,073,448 A | 6/2000 | Lozada |
| 6,085,520 A | 7/2000 | Kohno |
| 6,090,186 A | 7/2000 | Spencer |
| 6,119,802 A | 9/2000 | Puett, Jr. |
| 6,132,181 A | 10/2000 | Mccabe |
| 6,145,311 A | 11/2000 | Cyphelly |
| 6,148,602 A | 11/2000 | Demetri |
| 6,153,943 A | 11/2000 | Mistr, Jr. |
| 6,158,499 A | 12/2000 | Rhodes et al. |
| 6,170,443 B1 | 1/2001 | Hofbauer |
| 6,178,735 B1 | 1/2001 | Frutschi |
| 6,179,446 B1 | 1/2001 | Sarmadi |
| 6,188,182 B1 | 2/2001 | Nickols et al. |
| 6,202,707 B1 | 3/2001 | Woodall et al. |
| 6,206,660 B1 | 3/2001 | Coney et al. |
| 6,210,131 B1 | 4/2001 | Whitehead |
| 6,216,462 B1 | 4/2001 | Gray, Jr. |
| 6,225,706 B1 | 5/2001 | Keller |
| 6,276,123 B1 | 8/2001 | Chen et al. |
| 6,327,858 B1 | 12/2001 | Negre et al. |
| 6,327,994 B1 | 12/2001 | Labrador |
| 6,349,543 B1 | 2/2002 | Lisniansky |
| RE37,603 E | 3/2002 | Coney |
| 6,352,576 B1 | 3/2002 | Spencer et al. |
| 6,360,535 B1 | 3/2002 | Fisher |
| 6,367,570 B1 | 4/2002 | Long, III |
| 6,372,023 B1 | 4/2002 | Kiyono et al. |
| 6,389,814 B2 | 5/2002 | Viteri et al. |
| 6,397,578 B2 | 6/2002 | Tsukamoto |
| 6,401,458 B2 | 6/2002 | Jacobson |
| 6,407,465 B1 | 6/2002 | Peltz et al. |
| 6,419,462 B1 | 7/2002 | Horie et al. |
| 6,422,016 B2 | 7/2002 | Alkhamis |
| 6,453,659 B1 | 9/2002 | Van Liere et al. |
| 6,478,289 B1 | 11/2002 | Trewin |
| 6,484,498 B1 | 11/2002 | Bonar, II |
| 6,512,966 B2 | 1/2003 | Lof |
| 6,513,326 B1 | 2/2003 | Maceda et al. |
| 6,516,615 B1 | 2/2003 | Stockhausen et al. |
| 6,516,616 B2 | 2/2003 | Carver |
| 6,554,088 B2 | 4/2003 | Severinsky et al. |
| 6,598,392 B2 | 7/2003 | Majeres |
| 6,598,402 B2 | 7/2003 | Kataoka et al. |
| 6,606,860 B2 | 8/2003 | McFarland |
| 6,612,348 B1 | 9/2003 | Wiley |
| 6,619,930 B2 | 9/2003 | Jansen et al. |
| 6,626,212 B2 | 9/2003 | Morioka et al. |
| 6,629,413 B1 | 10/2003 | Wendt et al. |
| 6,637,185 B2 | 10/2003 | Hatamiya et al. |
| 6,652,241 B1 | 11/2003 | Alder |
| 6,652,243 B2 | 11/2003 | Krasnov |
| 6,666,024 B1 | 12/2003 | Moskal |
| 6,670,402 B1 | 12/2003 | Lee et al. |
| 6,672,056 B2 | 1/2004 | Roth et al. |
| 6,675,765 B2 | 1/2004 | Endoh et al. |
| 6,688,108 B1 | 2/2004 | Van Liere |
| 6,698,472 B2 | 3/2004 | Camacho |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,739,419 B2 | 5/2004 | Jain et al. |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,840,309 B2 | 1/2005 | Wilson et al. |
| 6,848,259 B2 | 2/2005 | Kelller-sornig |
| 6,857,450 B2 | 2/2005 | Rupp |
| 6,874,453 B2 | 4/2005 | Coney et al. |
| 6,883,775 B2 | 4/2005 | Coney et al. |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enis et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,887 B2 | 10/2006 | Nakamura et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Sieqel et al. |
| 7,169,489 B2 | 1/2007 | Redmond |
| 7,177,751 B2 | 2/2007 | Froloff |
| 7,178,337 B2 | 2/2007 | Pflanz |

(56) References Cited

U.S. PATENT DOCUMENTS

| | | |
|---|---|---|
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Lin, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,694,514 B2 | 4/2010 | Smith et al. |
| 7,802,426 B2 | 9/2010 | Bollinger |
| 7,827,787 B2 | 11/2010 | Cherney et al. |
| 7,832,207 B2 | 11/2010 | McBride et al. |
| 7,843,076 B2 | 11/2010 | Gogoana et al. |
| 7,874,155 B2 | 1/2011 | McBride et al. |
| 7,900,444 B1 | 3/2011 | McBride et al. |
| 7,958,731 B2 | 6/2011 | McBride et al. |
| 7,963,110 B2 | 6/2011 | Bollinger et al. |
| 8,037,678 B2 | 10/2011 | McBride et al. |
| 8,046,990 B2 | 11/2011 | Bollinger et al. |
| 8,104,274 B2 | 1/2012 | McBride et al. |
| 8,109,085 B2 | 2/2012 | McBride et al. |
| 8,117,842 B2 | 2/2012 | McBride et al. |
| 8,122,718 B2 | 2/2012 | McBride et al. |
| 8,171,728 B2 | 5/2012 | Bollinger et al. |
| 8,191,362 B2 | 6/2012 | McBride et al. |
| 8,225,606 B2 | 7/2012 | McBride et al. |
| 8,234,862 B2 | 8/2012 | McBride et al. |
| 8,234,863 B2 | 8/2012 | McBride et al. |
| 8,234,868 B2 | 8/2012 | Bollinger et al. |
| 8,240,140 B2 | 8/2012 | McBride et al. |
| 8,240,146 B1 | 8/2012 | Bollinger |
| 8,245,508 B2 | 8/2012 | Bollinger et al. |
| 8,250,863 B2 | 8/2012 | Bollinger et al. |
| 8,272,212 B2 | 9/2012 | Blieske |
| 8,359,856 B2 | 1/2013 | McBride et al. |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2005/0279296 A1 | 12/2005 | Coney et al. |
| 2006/0055175 A1 | 3/2006 | Grinblat |
| 2006/0059912 A1 | 3/2006 | Romanelli et al. |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioqlu |
| 2006/0218924 A1 | 10/2006 | Mitani |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0148731 A1* | 6/2008 | Cao ............... 60/641.2 |
| 2008/0155975 A1 | 7/2008 | Brinkman |
| 2008/0155976 A1 | 7/2008 | Smith et al. |
| 2008/0157528 A1 | 7/2008 | Wang et al. |

(56) References Cited

U.S. PATENT DOCUMENTS

| | | |
|---|---|---|
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall |
| 2009/0010772 A1 | 1/2009 | Siemroth |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer et al. |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | McBride et al. |
| 2010/0229544 A1 | 9/2010 | Bollinger et al. |
| 2010/0257862 A1 | 10/2010 | Howes et al. |
| 2010/0307156 A1 | 12/2010 | Bollinger et al. |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0106321 A1 | 5/2011 | Cherian et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |
| 2011/0252777 A1 | 10/2011 | Bollinger et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |
| 2011/0266810 A1 | 11/2011 | McBride et al. |
| 2011/0283690 A1 | 11/2011 | Bollinger et al. |
| 2011/0296822 A1 | 12/2011 | Bollinger et al. |
| 2011/0296823 A1 | 12/2011 | McBride et al. |
| 2011/0314800 A1 | 12/2011 | Fong et al. |
| 2011/0314804 A1 | 12/2011 | Fong et al. |
| 2011/0314810 A1 | 12/2011 | McBride et al. |
| 2012/0000557 A1 | 1/2012 | McBride et al. |
| 2012/0006013 A1 | 1/2012 | McBride et al. |
| 2012/0017580 A1 | 1/2012 | Fong et al. |
| 2012/0019009 A1 | 1/2012 | Fong et al. |
| 2012/0023919 A1 | 2/2012 | Fong et al. |
| 2012/0036851 A1 | 2/2012 | McBride et al. |
| 2012/0042772 A1 | 2/2012 | Fong et al. |
| 2012/0047884 A1 | 3/2012 | McBride et al. |
| 2012/0055146 A1 | 3/2012 | Baraga et al. |
| 2012/0057996 A1 | 3/2012 | Fong et al. |
| 2012/0057998 A1 | 3/2012 | Ingersoll et al. |
| 2012/0067036 A1 | 3/2012 | Fong et al. |
| 2012/0073432 A1 | 3/2012 | Ingersoll et al. |
| 2012/0085086 A1 | 4/2012 | Bollinger et al. |
| 2012/0090314 A1 | 4/2012 | Fong et al. |
| 2012/0096845 A1 | 4/2012 | Ingersoll et al. |
| 2012/0102935 A1 | 5/2012 | Ingersoll et al. |
| 2012/0102954 A1 | 5/2012 | Ingersoll et al. |
| 2012/0118137 A1 | 5/2012 | Fong et al. |
| 2012/0119513 A1 | 5/2012 | McBride et al. |
| 2012/0119514 A1 | 5/2012 | Crane et al. |
| 2012/0137668 A1 | 6/2012 | McBride et al. |
| 2012/0174569 A1 | 7/2012 | Ingersoll et al. |
| 2012/0197683 A1 | 8/2012 | Marcus |
| 2012/0210705 A1 | 8/2012 | McBride et al. |
| 2012/0222424 A1 | 9/2012 | Ingersoll et al. |
| 2012/0255292 A1 | 10/2012 | Fong et al. |
| 2012/0260645 A1 | 10/2012 | Fong et al. |
| 2012/0269651 A1 | 10/2012 | Fong et al. |
| 2012/0279209 A1 | 11/2012 | McBride et al. |
| 2012/0285154 A1 | 11/2012 | Bollinger et al. |
| 2012/0286522 A1 | 11/2012 | Stahlkopf et al. |
| 2012/0291989 A1 | 11/2012 | Fong et al. |
| 2012/0297772 A1 | 11/2012 | McBride et al. |
| 2012/0297776 A1 | 11/2012 | Bollinger et al. |
| 2012/0299310 A1 | 11/2012 | McBride et al. |
| 2013/0001958 A1 | 1/2013 | Crane et al. |
| 2013/0009408 A1 | 1/2013 | Crane et al. |
| 2013/0032743 A1 | 2/2013 | Fong et al. |
| 2013/0047597 A1 | 2/2013 | Fong et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |

FOREIGN PATENT DOCUMENTS

| | | |
|---|---|---|
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |

(56) References Cited

FOREIGN PATENT DOCUMENTS

| | | |
|---|---|---|
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 0476 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |
| EP | 1405662 | 4/2004 |
| EP | 1657452 | 11/2004 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 10313547 | 11/1998 |
| JP | 2000-346093 | 6/1999 |
| JP | 11351125 | 12/1999 |
| JP | 2000166128 | 6/2000 |
| JP | 2000346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-99/41498 | 8/1990 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-01/75308 | 10/2001 |
| WO | WO 0175290 | 10/2001 |
| WO | WO-02/25083 | 3/2002 |
| WO | WO-02/46621 | 6/2002 |
| WO | WO-02/103200 | 12/2002 |
| WO | WO-03/021107 | 3/2003 |
| WO | WO-03021702 | 3/2003 |
| WO | WO-03/078812 | 9/2003 |
| WO | WO-03081011 | 10/2003 |
| WO | WO-2004/037391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007/140914 | 12/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2009045468 | 4/2008 |
| WO | WO-2008/051427 | 5/2008 |

(56) References Cited

FOREIGN PATENT DOCUMENTS

| WO | WO-2008/074075 | 6/2008 |
|---|---|---|
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034548 | 3/2009 |
| WO | WO-2009/038973 | 3/2009 |
| WO | WO-2009034421 | 3/2009 |
| WO | WO-2009/045110 | 4/2009 |
| WO | WO-2009044139 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/040890 | 4/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |
| WO | WO-2011/079267 | 6/2011 |
| WO | WO-2011/079271 | 6/2011 |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Search Report and Written Opinion mailed May 25, 2011 for International Application No. PCT/US2010/027138, 12 pages.

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression," Purdue University International Compressor Engineering Conference (2002).

Linnemann et al., "The Isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).

Winterburn et al., "Mechanisms of Ultrasound Foam Interactions," Asia-Pac. J. Chem. Eng., vol. 4, pp. 184-190 (2009).

* cited by examiner

HEAT EXCHANGE WITH COMPRESSED GAS IN ENERGY-STORAGE SYSTEMS

RELATED APPLICATIONS

This application is a continuation of U.S. patent application Ser. No. 13/094,960, filed on Apr. 27, 2011, which (A) claims the benefit of and priority to U.S. Provisional Patent Application No. 61/328,408, filed Apr. 27, 2010; (B) is a continuation-in-part of U.S. patent application Ser. No. 12/690,513, filed Jan. 20, 2010, which claims priority to U.S. Provisional Patent Application No. 61/145,860, filed on Jan. 20, 2009, U.S. Provisional Patent Application No. 61/145,864, filed on Jan. 20, 2009, U.S. Provisional Patent Application No. 61/146,432, filed on Jan. 22, 2009, U.S. Provisional Patent Application No. 61/148,481, filed on Jan. 30, 2009, U.S. Provisional Patent Application No. 61/151,332, filed on Feb. 10, 2009, U.S. Provisional Patent Application No. 61/227,222, filed on Jul. 21, 2009, U.S. Provisional Patent Application No. 61/256,576, filed on Oct. 30, 2009, U.S. Provisional Patent Application No. 61/264,317, filed on Nov. 25, 2009, and U.S. Provisional Patent Application No. 61/266,758, filed on Dec. 4, 2009; and (C) is a continuation-in-part of U.S. patent application Ser. No. 12/639,703, filed Dec. 16, 2009, which (i) is a continuation-in-part of U.S. patent application Ser. No. 12/421,057, filed Apr. 9, 2009, which claims the benefit of and priority to U.S. Provisional Patent Application No. 61/148,691, filed Jan. 30, 2009, and U.S. Provisional Patent Application No. 61/043,630, filed Apr. 9, 2008; (ii) is a continuation-in-part of U.S. patent application Ser. No. 12/481,235, filed Jun. 9, 2009, which claims the benefit of and priority to U.S. Provisional Patent Application No. 61/059,964, filed Jun. 9, 2008; and (iii) claims the benefit of and priority to U.S. Provisional Patent Application Nos. 61/166,448, filed on Apr. 3, 2009; 61/184,166, filed on Jun. 4, 2009; 61/223,564, filed on Jul. 7, 2009; 61/227,222, filed on Jul. 21, 2009; and 61/251,965, filed on Oct. 15, 2009. The entire disclosure of each of these applications is hereby incorporated herein by reference.

STATEMENT REGARDING FEDERALLY SPONSORED RESEARCH

This invention was made with government support under IIP-0810590 and IIP-0923633 awarded by the NSF. The government has certain rights in the invention.

FIELD OF THE INVENTION

In various embodiments, the present invention relates to pneumatics, power generation, and energy storage, and more particularly, to compressed-gas energy-storage systems and methods using pneumatic or pneumatic/hydraulic cylinders, as well as to the heating and cooling of stored compressed gas in such systems.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. Pat. No. 7,832,207 (the '207 patent) and U.S. patent application Ser. No. 12/639,703 (the '703 application), the disclosures of which are hereby incorporated herein by reference in their entireties. The '207 patent and the '703 application disclose systems and methods for expanding gas isothermally in staged cylinders and intensifiers over a large pressure range in order to generate electrical energy when required. Mechanical energy from the expanding gas may be used to drive a hydraulic pump/motor subsystem that produces electricity. Systems and methods for hydraulic-pneumatic pressure intensification that may be employed in systems and methods such as those disclosed in the '207 patent and the '703 application are shown and described in U.S. patent application Ser. No. 12/879,595 (the '595 application), the disclosure of which is hereby incorporated herein by reference in its entirety.

In the systems disclosed in the '207 patent and the '703 application, reciprocal mechanical motion is produced during recovery of energy from storage by expansion of gas in the cylinders. This reciprocal motion may be converted to electricity by a variety of means, for example as disclosed in the '595 application as well as in U.S. patent application Ser. No. 12/938,853 (the '853 application), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

The efficiency, cost effectiveness, and performance of compressed-air energy storage systems can be improved through subsystems designed for effective heat transfer to and from the gas being, respectively, expanded and compressed. Additionally, pre-heating of stored compressed gas during expansion, which can employ low-grade process heat or even heat from the ambient environment, effectively increases the energy stored in a given volume at a given pressure and can improve compressed-air energy storage system efficiency and/or power output.

SUMMARY

Embodiments of the present invention feature compressed-gas energy-conversion systems that include one or more reservoirs (e.g., pressure vessels or naturally occurring or artificially created formations such as caverns) for storage of the compressed gas, as well as a heat-exchange subsystem for thermal conditioning (i.e., heating and/or cooling, in many embodiments for maintaining of a substantially constant temperature during, e.g., storage and/or processing (e.g., transfers into and/or out of a system component and/or compression and/or expansion within a component)) the gas within the reservoir. The power output of such compressed-gas energy-storage-and-recovery systems may be governed, at least in part, by the pressure and volumetric rate of compressed-air expansion and by the temperature of the expanded gas. The round-trip efficiency of the system is also influenced by the energy consumed during compression, which is minimized by compressing isothermally (less work is required to compress a quantity of gas that stays at a constant temperature than one that gets hotter as it is compressed). Therefore, the ability to expand and compress the gas isothermally or near-isothermally at a faster rate will result in greater power output for the system while maintaining the total energy output—considering expansion gains alone—at nearly triple that of a system using adiabatic expansion.

Preheating a certain mass of compressed air in a fixed volume or reservoir, such as one or more pressure vessels or caverns, will generally increase the pressure of the compressed air and thus the stored potential energy. Upon expansion, more energy will be recovered from the compressed air, essentially recovering energy from the heat source (e.g., waste heat, process heat, ground loop); also, the final temperature of the expanded air will be higher than when the initial compressed air is at ambient temperature. Likewise, cooling of the stored compressed gas will generally decrease the pressure in the reservoir and thus reduce the work necessary to compress more gas into them. When the stored compressed gas later increases in temperature (e.g., through preheating), the energy stored in the reservoir will increase. Thus, by pre-cooling the compressed gas and/or cooling the gas during compression, less energy will be required in the compression phase. These principles are advantageously harnessed in the systems depicted in the figures and detailed below.

Embodiments of the invention combine systems and techniques for heating and cooling compressed gas with the aforementioned compressed-gas energy-storage systems to enable cost-effective, efficient energy storage. In various embodiments, a heat-exchange subsystem is used to facilitate and expedite heat transfer to (from) stored compressed gas prior to and during gas expansion (compression) of the compressed-gas energy storage system. The heat-exchange subsystem may be combined with thermal systems to increase power density and efficiency by utilizing the thermal systems to chill or heat the transfer medium (e.g., water) and thereafter the compressed gas. In one application, excess thermal energy (waste heat) from power plants or industrial processes is used to preheat the compressed gas in the heat-exchange subsystem of the compressed-gas energy-storage system. In such cases, the effective power density of the energy storage system may be increased further by using it to heat the gas during expansion of stored gas. Similarly, chilled water, such as may be available at low cost from the local environment (e.g., from a river), may be used to pre-cool the stored compressed gas prior to further compression and cool the compressed gas during compression, decreasing power requirements during compression. In the absence of such heating or cooling sources, heated and chilled water may be efficiently generated using ground loops, water loops, heat pumps or other means.

In various embodiments, the invention relates to the combination of local sources or sinks of thermal energy to increase the effective power density and storage capacity of a compressed-gas energy storage system. Management of such sources and sinks may include recovering waste thermal energy from an installation (e.g., industrial process) to increase power output during or prior to gas expansion or rejecting thermal energy to the environment (e.g., via river water, chillers, heat exchangers) to decrease power input during or prior to gas compression. In one embodiment, power from an electric generating plant is stored, and the storage system's power output is increased using heat from the generating plant that would otherwise be wasted (i.e., lost) to the environment. The installation supplying heat to the compressed gas prior to and during expansion may be a fossil-fuel based power plant, a heat-engine based power plant, a nuclear power plant, a geothermal system, an industrial process producing waste heat, a heat pump, or a source of cold water. In power plant applications, the generated power may be used to drive the compressed-gas energy storage system, producing compressed gas, which is then stored in at least one pressure vessel or other reservoir.

Embodiments of the present invention are typically utilized in energy storage and generation systems utilizing compressed gas. In a compressed-gas energy storage system, gas is stored at high pressure (e.g., approximately 3,000 psi). This gas may be expanded into a cylinder having a first compartment (or "chamber") and a second compartment separated by a piston slidably disposed within the cylinder (or other boundary mechanism). A shaft may be coupled to the piston and extend through the first compartment and/or the second compartment of the cylinder and beyond an end cap of the cylinder, and a transmission mechanism may be coupled to the shaft for converting a reciprocal motion of the shaft into a rotary motion, as described in the '595 and '853 applications. Moreover, a motor/generator may be coupled to the transmission mechanism. Alternatively or additionally, the shaft of the cylinders may be coupled to one or more linear generators, as described in the '853 application.

As also described in the '853 application, the range of forces produced by expanding a given quantity of gas in a given time may be reduced through the addition of multiple, series-connected cylinder stages. That is, as gas from a high-pressure reservoir is expanded in one chamber of a first, high-pressure cylinder, gas from the other chamber of the first cylinder is directed to the expansion chamber of a second, lower-pressure cylinder. Gas from the lower-pressure chamber of this second cylinder may either be vented to the environment or directed to the expansion chamber of a third cylinder operating at still lower pressure; the third cylinder may be similarly connected to a fourth cylinder; and so on.

The principle may be extended to more than two cylinders to suit particular applications. For example, a narrower output force range for a given range of reservoir pressures is achieved by having a first, high-pressure cylinder operating between, for example, approximately 2,500 psig and approximately 50 psig and a second, larger-volume, lower-pressure cylinder operating between, for example, approximately 50 psig and approximately 1 psig. When two expansion cylinders are used, the range of pressure within either cylinder (and thus the range of force produced by either cylinder) is reduced as the square root relative to the range of pressure (or force) experienced with a single expansion cylinder, e.g., from approximately 2500:1 to approximately 50:1 (as set forth in the '853 application). Furthermore, as set forth in the '595 application, N appropriately sized cylinders can reduce an original operating pressure range R to $R^{1/N}$. Any group of N cylinders staged in this manner, where $N \geq 2$, is herein termed a cylinder group.

All of the approaches described above for converting potential energy in compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

Embodiments of the invention may be implemented using any of the integrated heat-transfer systems and methods described in the '703 application and/or with the external heat-transfer systems and methods described in the '426 patent. In addition, the systems described herein, and/or other embodiments employing liquid-spray heat exchange or external gas heat exchange, may draw or deliver thermal energy via their heat-exchange mechanisms to external systems (not shown) for purposes of cogeneration, as described in U.S. patent application Ser. No. 12/690,513, filed Jan. 20, 2010 (the '513 application), the entire disclosure of which is incorporated by reference herein.

The compressed-air energy storage and recovery systems described herein are preferably "open-air" systems, i.e., systems that take in air from the ambient atmosphere for compression and vent air back to the ambient after expansion, rather than systems that compress and expand a captured volume of gas in a sealed container (i.e., "closed-air" systems). Thus, the systems described herein generally feature one or more cylinder assemblies for the storage and recovery of energy via compression and expansion of gas. Selectively fluidly connected to the cylinder assembly are (i) means for storage of compressed gas after compression and supply of compressed gas for expansion thereof, and (ii) a vent for exhausting expanded gas to atmosphere after expansion and supply of gas for compression. The means for storage of compressed gas may include or consist essentially of, e.g., one or more pressure vessels or naturally occurring formations such as caverns or other large cavities. Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature a compressed-gas energy storage and recovery system that includes or consists essentially of a cylinder assembly for compressing gas to store energy and/or expanding gas to recover energy, a compressed-gas reservoir for storage of gas after compression and supply of compressed gas for expansion, and a heat-exchange subsystem for thermally conditioning gas within the compressed-gas reservoir via heat exchange between the gas and a heat-exchange fluid not in fluid communication with the gas. The compressed-gas reservoir is selectively fluidly connected to the cylinder assembly.

Embodiments of the invention may feature one or more of the following, in any of a number of combinations. The compressed-gas reservoir may include or consist essentially of a plurality of pressure vessels. The heat-exchange subsystem may circulate the heat-exchange fluid around each of the pressure vessels to exchange heat through a wall thereof with gas in the pressure vessels. The plurality of pressure vessels may be disposed in an enclosure, and the heat-exchange fluid may be circulated through the enclosure. The heat-exchange fluid may include or consist essentially of a liquid, e.g., water. The pressure vessels may be submerged in the heat-exchange fluid. The heat-exchange fluid may include or consist essentially of a heat-exchange gas, e.g., air (for example atmospheric air). The enclosure may comprise an opening therein, and the heat-exchange subsystem may include or consist essentially of a fan for drawing the heat-exchange gas into the enclosure through the opening.

The heat-exchange subsystem may include a heat exchanger, through which the heat-exchange fluid is circulated, for maintaining the heat-exchange fluid at a substantially constant temperature. The heat-exchange subsystem may include a conduit, disposed within the compressed-gas reservoir, through which the heat-exchange fluid is circulated during heat exchange between the heat-exchange fluid and the gas. The conduit may include one or more fins thereon for expediting the heat exchange. The heat-exchange fluid may include or consist essentially of a liquid, e.g., water. A fluid reservoir may be in fluid communication with the conduit, and heat-exchange fluid may be circulated from the fluid reservoir, through the conduit, and back to the fluid reservoir.

A vent for exhausting expanded gas to atmosphere and supply of gas for compression thereof may be selectively fluidly connected to the cylinder assembly. An intermittent renewable energy source (e.g., of wind or solar energy) may be connected to the cylinder assembly. Energy stored during compression of the gas may originate from the intermittent renewable energy source, and/or energy may be recovered via expansion of the gas when the intermittent renewable energy source is nonfunctional. A movable boundary mechanism (e.g., a piston) may separate the cylinder assembly into two chambers. A crankshaft for converting reciprocal motion of the boundary mechanism into rotary motion may be mechanically coupled to the boundary mechanism. A motor/generator may be coupled to the crankshaft.

The system may include a second heat-exchange subsystem (which may be separate and different from the heat-exchange system) for thermally conditioning gas in the cylinder assembly (e.g., during the compression and/or expansion), thereby increasing efficiency of the energy storage and recovery. The heat-exchange subsystem and the second heat-exchange subsystem may both utilize the heat-exchange fluid for heat exchange (e.g., by spraying it within the compressed-gas reservoir and the cylinder assembly, respectively). The system may include an external heating or cooling source (e.g., a thermal well) for maintaining the heat-exchange fluid at a substantially constant temperature. The external heating or cooling source may include or consist essentially of a fossil fuel power plant, a heat engine power plant, a solar thermal source, a geothermal source, an industrial process with waste heat, a heat pump, a heat source, a heat sink, and/or a source of environmentally chilled water.

In another aspect, embodiments of the invention feature a compressed-gas energy storage and recovery system including or consisting essentially of a cylinder assembly for compressing gas to store energy and/or expanding gas to recover energy, a compressed-gas reservoir for storage of gas after compression and supply of compressed gas for expansion, and a heat-exchange subsystem for thermally conditioning gas within the compressed-gas reservoir prior to introduction of the gas into the cylinder assembly. The compressed-gas reservoir is selectively fluidly connected to the cylinder assembly.

Embodiments of the invention may feature one or more of the following, in any of a number of combinations. The heat-exchange subsystem may include or consist essentially of a heat exchanger and a circulation apparatus for circulating a fluid from the compressed-gas reservoir to the heat exchanger and back to the compressed-gas reservoir. The fluid may include or consist essentially of gas stored in the compressed-gas reservoir. The circulation apparatus may include or consist essentially of an air pump (i.e., a pump for circulating air or other gas(es)). The heat-exchanger may include or consist essentially of an air-to-air heat exchanger for exchanging heat between the fluid and a heat-exchange gas flowing through the heat exchanger. The heat exchanger may include or consist essentially of an air-to-liquid heat exchanger for exchanging heat between the fluid and a heat-exchange liquid flowing through the heat exchanger. The compressed-gas reservoir may include or consist essentially of a plurality of pressure vessels serially connected such that the fluid is circulated through each of the pressure vessels before circulation to the heat exchanger.

A spray mechanism (e.g., a spray head and/or a spray rod) may be disposed in the compressed-gas reservoir, and the fluid may include or consist essentially of a heat-exchange fluid introduced into the compressed-gas reservoir through the spray mechanism. The heat-exchange fluid may include or consist essentially of water. The circulation apparatus may include or consist essentially of a water pump (i.e., a pump for circulating water or other liquid(s)). The compressed-gas reservoir may include or consist essentially of a pressure vessel, a naturally occurring cavern, and/or an artificially created cavern (e.g., a mine). The heat exchanger may be in fluid communication (e.g., in a circuit different from that of the heat-exchange fluid) with an external heating or cooling source (e.g., a thermal well). The external heating or cooling source may include or consist essentially of a fossil fuel power plant, a heat engine power plant, a solar thermal source, a geothermal source, an industrial process with waste heat, a heat pump, a heat source, a heat sink, and/or a source of environmentally chilled water.

In yet another aspect, embodiments of the invention feature a method for improving efficiency of a compressed-gas energy storage and recovery system. Within a cylinder assembly, gas is compressed to store energy and/or gas is expanded to recover energy. Within a compressed-gas reservoir separate from the cylinder assembly, gas is thermally conditioned by heating gas prior to expansion and/or cooling gas after compression.

Embodiments of the invention may feature one or more of the following, in any of a number of combinations. Thermally conditioning gas may include or consist essentially of circulating a heat-exchange fluid around the compressed-gas reservoir to exchange heat through a wall of the reservoir with gas in the reservoir. The heat-exchange fluid may be thermally conditioned to maintain the heat-exchange fluid at a substantially constant temperature. Thermally conditioning the heat-exchange fluid may include or consist essentially of exchanging heat between the heat-exchange fluid and a separate liquid and/or a separate gas. The heat-exchange fluid may include or consist essentially of a liquid (e.g., water) or a gas (e.g., air such as atmospheric air). Thermally conditioning gas may include or consist essentially of submerging the compressed-gas reservoir in heat-exchange liquid. Thermally conditioning gas may include or consist essentially of introducing (e.g., spraying) a heat-exchange fluid within the compressed-gas reservoir to exchange heat with gas in the compressed-gas reservoir. Introducing the heat-exchange fluid may include or consist essentially of circulating the heat-exchange fluid through the compressed-gas reservoir such that the heat-exchange fluid is not in fluid communication with gas in the reservoir. The heat-exchange fluid may be circulated from a fluid reservoir containing heat-exchange fluid at a substantially constant temperature, into the compressed-gas reservoir, and back to the fluid reservoir.

The gas may be thermally conditioned within the cylinder assembly during the compression and/or expansion, thereby increasing efficiency of the energy storage and recovery, and such thermal conditioning may render the compression and/or expansion substantially isothermal. Expanded gas may be vented to atmosphere. Compressed gas may be stored in the compressed-gas reservoir. Energy stored during compression of the gas may originate from an intermittent renewable energy source (e.g., of wind or solar energy), and energy may be recovered via expansion of the gas when the intermittent renewable energy source is nonfunctional. The compression and/or expansion may result in reciprocal motion of a boundary mechanism (e.g., a piston) within the cylinder assembly, and the reciprocal motion may be converted into rotary motion (e.g., via a crankshaft or other mechanism). Thermal energy for the thermal conditioning may be recovered from an external source including or consisting essentially of a fossil fuel power plant, a heat engine power plant, a solar thermal source, a geothermal source, an industrial process with waste heat, a heat pump, a heat source, a heat sink, and/or a source of environmentally chilled water. Gas may be transferred from the cylinder assembly to the compressed-gas reservoir after compression of the gas in the cylinder assembly and/or transferred from the compressed-gas reservoir to the cylinder assembly prior to expansion of the gas in the cylinder assembly. The gas may be thermally conditioned during either or both of these transfers. The compressed-gas reservoir may be selectively fluidly connectable to the cylinder assembly (e.g., via one or more valves and one or more conduits therebetween).

In a further aspect, embodiments of the invention feature a method for improving efficiency of a compressed-gas energy storage and recovery system. Within a cylinder assembly, gas is compressed to store energy and/or gas is expanded to recover energy. Gas is transferred from the cylinder assembly after compression of the gas therein and/or to the cylinder assembly prior to expansion of the gas therein. Outside of the cylinder assembly, the gas is thermally conditioned during the transfer from the cylinder assembly and/or the transfer to the cylinder assembly.

Embodiments of the invention may feature one or more of the following, in any of a number of combinations. Thermally conditioning the gas may include or consist essentially of heating gas during the transfer to the cylinder assembly and/ or cooling gas during the transfer from the cylinder assembly. The gas may be transferred to and/or from a compressed-gas reservoir, and the thermal conditioning of the gas may be performed within the compressed-gas reservoir and/or a conduit connecting the cylinder assembly to the compressed-gas reservoir. Thermally conditioning gas may include or consist essentially of circulating a heat-exchange fluid around the compressed-gas reservoir to exchange heat through a wall of the reservoir with gas in the reservoir. The heat-exchange fluid may be thermally conditioned to maintain it at a substantially constant temperature. Thermally conditioning the heat-exchange fluid may include or consist essentially of exchanging heat between the heat-exchange fluid and a separate liquid and/or a separate gas. The heat-exchange fluid may include or consist essentially of a liquid (e.g., water) and/or a gas (e.g., air such as atmospheric air). Thermally conditioning gas may include or consist essentially of submerging the compressed-gas reservoir in heat-exchange liquid. Thermally conditioning gas may include or consist essentially of spraying a heat-exchange fluid into the gas during the transfer of gas from and/or to the cylinder assembly. The heat-exchange fluid may be sprayed into a compressed-gas reservoir and/or a conduit connecting the cylinder assembly to the compressed-gas reservoir. Thermally conditioning gas may include or consist essentially of circulating through the gas a heat-exchange fluid not in fluid communication with the gas. The heat-exchange fluid may be circulated from a fluid reservoir containing heat-exchange fluid at a substantially constant temperature, into the gas, and back to the fluid reservoir.

The gas may be thermally conditioned within the cylinder assembly during the compression and/or expansion, thereby increasing efficiency of the energy storage and recovery, and the thermal conditioning may render the compression and/or expansion substantially isothermal. Expanded gas may be vented to atmosphere. Transferring gas from the cylinder assembly may include or consist essentially of storing gas in a compressed-gas reservoir. Energy stored during compression of the gas may originate from an intermittent renewable energy source (e.g., of wind or solar energy), and energy may be recovered via expansion of the gas when the intermittent renewable energy source is nonfunctional. The compression and/or expansion may result in reciprocal motion of a boundary mechanism (e.g., a piston) within the cylinder assembly, and the reciprocal motion may be converted into rotary motion (e.g., via a crankshaft or other mechanism). Thermal energy for the thermal conditioning may be recovered from an external source including or consisting essentially of a fossil fuel power plant, a heat engine power plant, a solar thermal source, a geothermal source, an industrial process with waste heat, a heat pump, a heat source, a heat sink, and/or a source of environmentally chilled water. Outside the cylinder assembly (e.g., within a compressed-gas reservoir), gas may be heated prior to expansion and/or cooled after compression.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein unless otherwise indicated, the term "substantially" means ±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '595 and '853 applications. Herein, the terms "heat-transfer" and "heat-exchange" are used interchangeably.

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
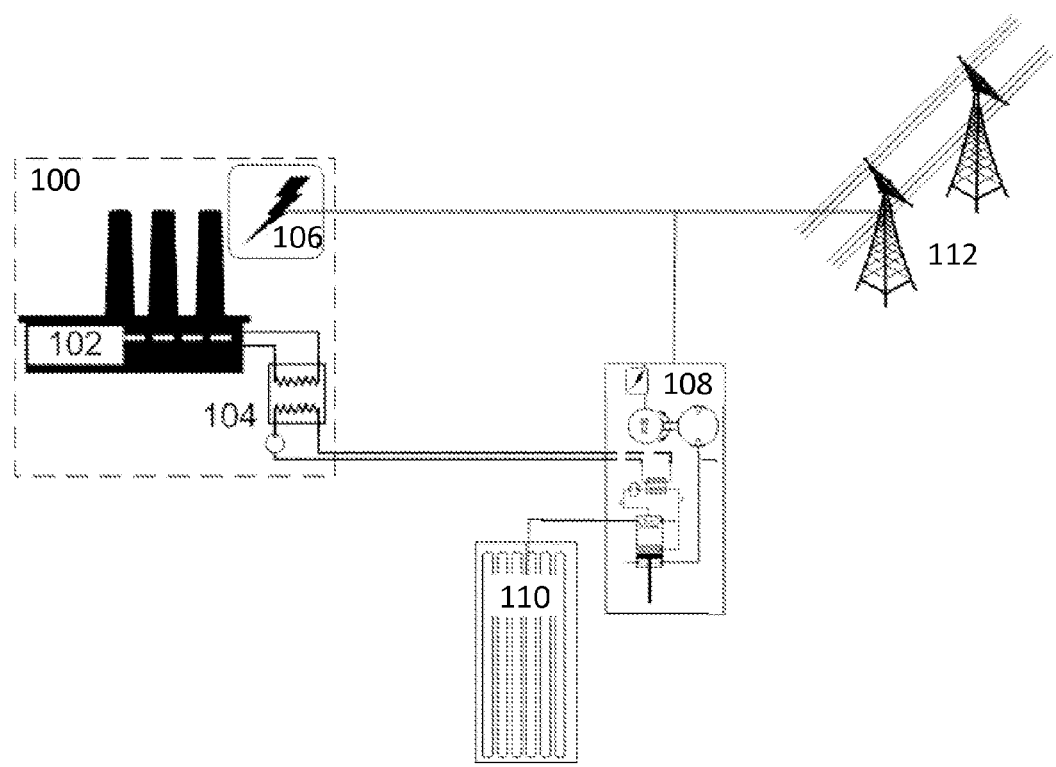
FIG. 1 is a schematic of various components of an energy storage and recovery system in accordance with various embodiments of the invention, and illustrating an application where waste heat from a power plant is used to heat stored compressed gas prior to and/or during expansion in the system.

FIG. 1 is a diagram of various components of an energy storage and recovery system in accordance with various embodiments of the invention. The illustrated system includes or consists essentially of an installation 100 where thermal energy is available for recovery, extracted from the surroundings, needed for usage, and/or may be removed for cooling. Example installations 100 include fossil-fuel based power plants (e.g., coal, natural gas); other heat-engine based power plants such as nuclear, solar thermal, and geothermal; industrial processes with waste heat; heat pumps, heat sources, and heat sinks; buildings needing space heating or cooling; and sources of environmentally chilled water. In FIG. 1, for illustrative purposes, a power plant 102 is shown whose excess thermal energy is recoverable through a standard heat-exchange unit 104. Generated power 106 from the power plant 102 may be used to drive the compressed-gas energy storage system 108 as determined by the operator (e.g., when market demand for power is low), storing energy in the form of compressed gas in pressure vessels 110, caverns, or other means of high-pressure gas storage. Upon demand for increased power, this stored energy in the form of compressed gas in pressure vessels 110 undergoes expansion (e.g., staged expansion) in the compressed-gas energy storage system 108 to generate power for usage (e.g., power grid delivery 112). The recovered thermal energy from the power plant 102 may be used in the heat-exchange subsystem of the compressed-gas pressure vessels 110 (or other pressurized storage) to preheat the stored compressed gas and/or to heat the heat-exchange fluid and gas during expansion, increasing the work done by a given volume of pressurized gas and improving system efficiency and/or performance. Likewise, but not illustrated herein, water cooled by heat exchange with cold environments, ground loops, or water loops, or other low temperature reservoirs may be used in the heat-exchange subsystem to pre-cool and/or continually cool the compressed gas prior to and during further compression, improving system efficiency and/or performance. In all these instances, performance and/or value of the system may be markedly improved.

Figure 2:
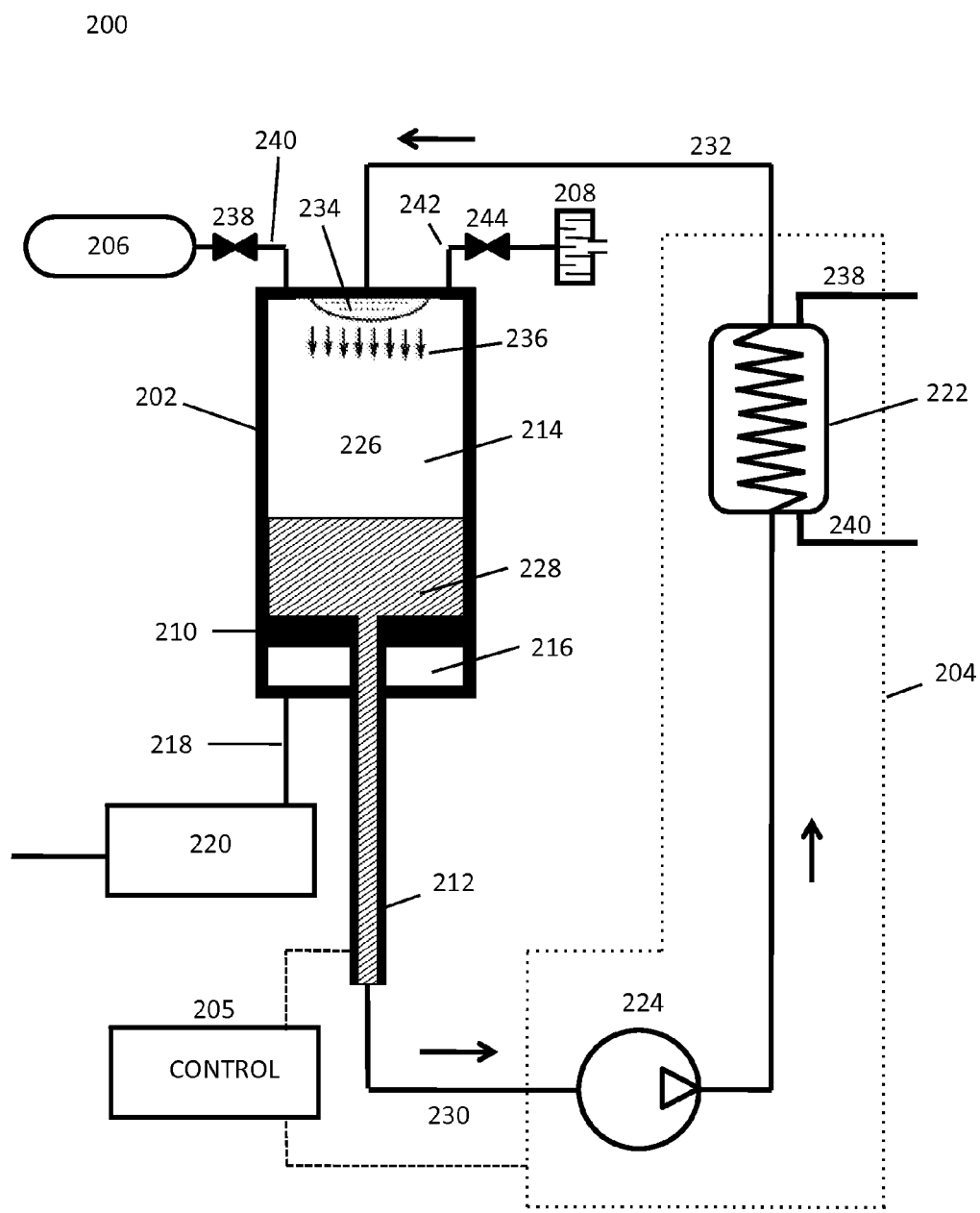
FIG. 2 is a schematic cross-section of a cylinder with a closed-loop liquid-injection system within a compressed-air energy storage and recovery system in accordance with various embodiments of the invention.

FIG. 2 illustrates a pneumatic cylinder with a closed-loop water-injection system within a compressed air energy storage and recovery system 200. The system 200 includes a cylinder assembly 202, a heat-transfer subsystem 204, and a control system 205 for controlling operation of the various components of system 200. During system operation, compressed air is either directed into vessel 206 (e.g., one or more pressure vessels or naturally occurring formations such as caverns) during storage of energy or released from vessel 206 during recovery of stored energy. Air is admitted to the system 200 through vent 208 during storage of energy, or exhausted from the system 200 through vent 208 during release of energy.

The control system 205 may be any acceptable control device with a human-machine interface. For example, the control system 205 may include a computer (for example a PC-type) that executes a stored control application in the form of a computer-readable software medium. More generally, control system 205 may be realized as software, hardware, or some combination thereof. For example, controller 205 may be implemented on one or more computers, such as a PC having a CPU board containing one or more processors such as the Pentium, Core, Atom, or Celeron family of processors manufactured by Intel Corporation of Santa Clara, Calif., the 680×0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly storage devices.

For embodiments in which the functions of controller 205 are provided by software, the program may be written in any one of a number of high level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

The control system 205 may receive telemetry from sensors monitoring various aspects of the operation of system 200 (as described below), and may provide signals to control valve actuators, valves, motors, and other electromechanical/electronic devices. Control system 205 may communicate with such sensors and/or other components of system 200 via wired or wireless communication. An appropriate interface may be used to convert data from sensors into a form readable by the control system 205 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

The cylinder assembly 202 includes a piston 210 (or other suitable boundary mechanism) slidably disposed therein with a center-drilled rod 212 extending from piston 210 and preferably defining a fluid passageway. The piston 210 divides the cylinder assembly 202 into a first chamber (or "compartment") 214 and a second chamber 216. The rod 212 may be attached to a mechanical load, for example, a crankshaft or hydraulic system. Alternatively or in addition, the second chamber 216 may contain hydraulic fluid that is coupled through other pipes 218 and valves to a hydraulic system 220 (which may include, e.g., a hydraulic motor/pump and an electrical motor/generator). The heat-transfer subsystem 204 includes or consists essentially of a heat exchanger 222 and a booster-pump assembly 224.

At any time during an expansion or compression phase of gas within the first or upper chamber 214 of the cylinder assembly 202, the chamber 214 will typically contain a gas 226 (e.g., previously admitted from storage vessel 206 during the expansion phase or from vent 208 during the compression phase) and (e.g., an accumulation of) heat-transfer fluid 228 at substantially equal pressure $P_s$, (e.g., up to approximately 3,000 psig). The heat-transfer fluid 228 may be drawn through the center-drilled rod 212 and through a pipe 230 by the pump 224. The pump 224 raises the pressure of the heat-transfer fluid 228 to a pressure $P_i'$ (e.g., up to approximately 3,015 psig) somewhat higher than $P_s$, as described in U.S. patent application Ser. No. 13/009,409, filed on Jan. 19, 2011 (the '409 application), the entire disclosure of which is incorporated by reference herein. The heat-transfer fluid 228 is then sent through the heat exchanger 222, where its temperature is altered, and then through a pipe 232 to a spray mechanism 234 disposed within the cylinder assembly 202. In various embodiments, when the cylinder assembly 202 is operated as an expander, a spray 236 of the heat-transfer fluid 228 is introduced into the cylinder assembly 202 at a higher temperature than the gas 226 and, therefore, transfers thermal energy to the gas 226 and increases the amount of work done by the gas 226 on the piston 210 as the gas 226 expands. In an alternative mode of operation, when the cylinder assembly 202 is operated as a compressor, the heat-transfer fluid 228 is introduced at a lower temperature than the gas 226. Control system 205 may enforce substantially isothermal operation, i.e., expansion and/or compression of gas in cylinder assembly 202, via control over, e.g., the introduction of gas into and the exhausting of gas out of cylinder assembly 202, the rates of compression and/or expansion, and/or the operation of heat-transfer subsystem 204 in response to sensed conditions. For example, control system 205 may be responsive to one or more sensors disposed in or on cylinder assembly 202 for measuring the temperature of the gas and/or the heat-transfer fluid within cylinder assembly 202, responding to deviations in temperature by issuing control signals that operate one or more of the system components noted above to compensate, in real time, for the sensed temperature deviations. For example, in response to a temperature increase within cylinder assembly 202, control system 205 may issue commands to increase the flow rate of spray 236 of heat-transfer fluid 228.

The circulating system 224 described above will typically have higher efficiency than a system which pumps liquid from a low intake pressure (e.g., approximately 0 psig) to $P_i'$, as detailed in the '409 application. In some embodiments, the heat-transfer fluid 228 (and/or other heat-transfer fluids described herein) incorporates one or more additives and/or solutes in order to, e.g., reduce the solubility of the gas therein and/or to slow the dissolution of the gas therein, reduce or otherwise alter the surface tension of the heat-transfer fluid, retard or prevent corrosion, enhance lubricity, and/or prevent formation of or kill microorganisms such as bacteria, as described in U.S. patent application Ser. No. 13/082,808, filed Apr. 8, 2011 (the '808 application), the entire disclosure of which is incorporated by reference herein.

Furthermore, embodiments of the invention may be applied to systems in which chamber 214 is in fluid communication with a pneumatic chamber of a second cylinder (rather than with vessel 206). That second cylinder, in turn, may communicate similarly with a third cylinder, and so forth. Any number of cylinders may be linked in this way. These cylinders may be connected in parallel or in a series configuration, where the compression and expansion is done in multiple stages.

The fluid circuit of heat exchanger 222 may be filled with water, a coolant mixture, and/or any acceptable heat-transfer medium. In alternative embodiments, a gas, such as air or refrigerant, is used as the heat-transfer medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

In various embodiments, the heat-exchange fluid is conditioned (i.e., pre-heated and/or pre-chilled) or used for heating or cooling needs by connecting the fluid inlet 238 and fluid outlet 240 of the external heat exchange side of the heat exchanger 222 to an installation, such as a heat-engine power plant, an industrial process with waste heat, a heat pump, and/or a building needing space heating or cooling, as described above and in the '513 application. The installation may be a large water reservoir that acts as a constant-temperature thermal fluid source for use with the system. Alternatively, the water reservoir may be thermally linked to waste heat from an industrial process or the like, as described above, via another heat exchanger contained within the installation. This allows the heat-transfer fluid to acquire or expel heat from/to the linked process, depending on configuration, for later use as a heating/cooling medium in the compressed air energy storage/conversion system.

Figure 3:
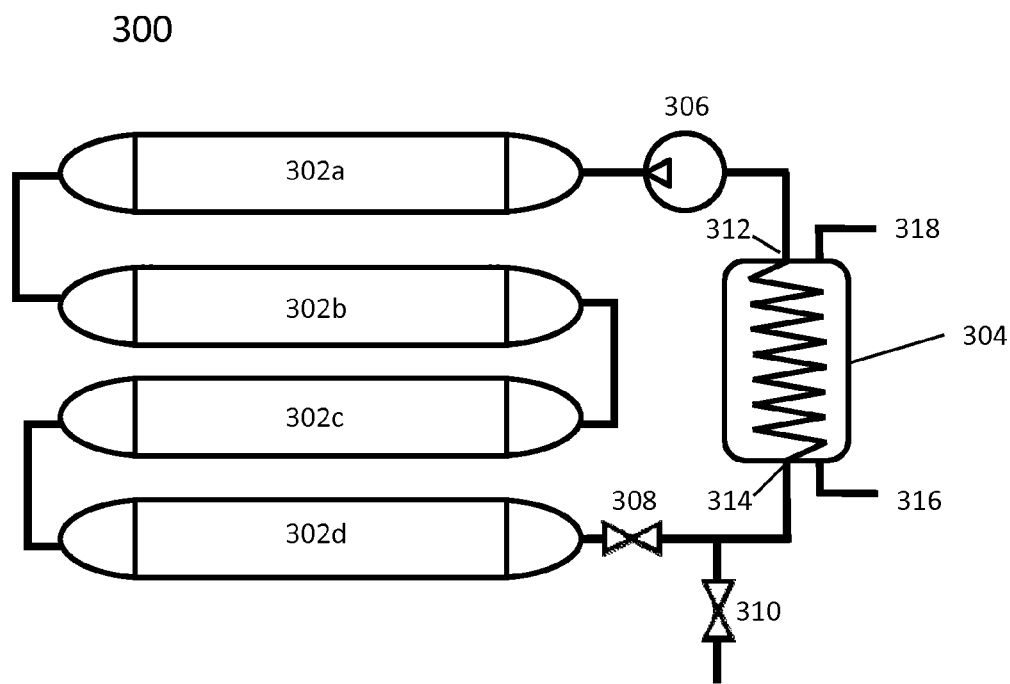
FIGS. 3 and 4 are schematic diagrams of compressed-gas storage subsystems for heating and cooling compressed gas in energy-conversion systems in accordance with various embodiments of the invention.
Figure 4:
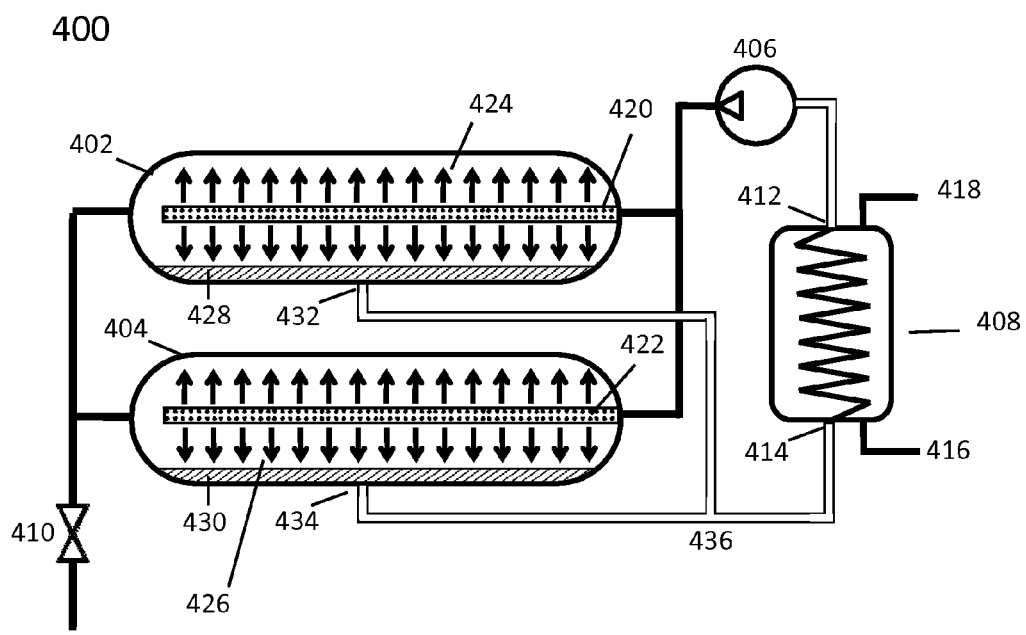

The heat-transfer subsystems similar to those discussed above and/or depicted in FIG. 2 may also be used in conjunction with the high-pressure gas-storage systems (e.g., vessel 206) to thermally condition the pressurized gas stored therein, as shown in FIGS. 3 and 4. FIG. 3 depicts a heat-transfer subsystem 300 incorporating a gas storage system for use with the compressed-gas energy conversion systems described herein, to expedite transfer of thermal energy to, for example, the compressed gas prior to and during expansion. Compressed gas from the pressure vessels (302a-302d) is circulated through a heat exchanger 304 using an air pump 306 operating as a circulator. The air pump 306 operates with a small pressure change sufficient for circulation, but within a housing that is able to withstand high pressures, as detailed in the '409 application. The air pump 306 circulates the high-pressure air through the heat exchanger 304 without substantially increasing its pressure (e.g., a 50 psi increase for 3,000 psi air). In this way, the stored compressed air may be pre-heated (or pre-cooled) by opening valve 308 with valve 310 closed and heated during expansion or cooled during compression by closing valve 308 and opening valve 310. Valve 310, when open, places the subsystem 300 in fluid communication with an energy-storage system such as system 200 in FIG. 2; in FIG. 2, the gas storage vessel 206 may be replaced by a subsystem such as subsystem 300 in FIG. 3. The heat exchanger 304 may be any sort of standard heat-exchanger design; illustrated here is a tube-in-shell type heat exchanger with high-pressure air inlet and outlet ports 312 and 314 and low-pressure shell ports 316 and 318 (which may be connected to an external heating or cooling source, as described above).

Preheating a particular mass of compressed air in a fixed volume such as pressure vessels 302a-302d will generally increase the pressure of the compressed air and thus the stored potential energy. Upon expansion, more energy will be recovered from the compressed air, essentially recuperating energy from the heat source (e.g., waste heat, process heat, ground loop); also, the final temperature of the expanded air will be higher than when the initial compressed air is at ambient temperature. Likewise, cooling of the stored compressed gas will generally decrease the pressure and thus reduce the work necessary to compress more gas into pressure vessels 302a-302d. Thus, by pre-cooling the stored compressed gas and cooling the gas during compression, relatively less energy will be required in the compression phase. When the stored compressed gas later increases in temperature (e.g., by deliberate preheating), the energy stored in 302a-302d will increase. The vessels 302a-302d are depicted in FIG. 3 in a horizontal position but other orientations are contemplated and within the scope of the invention.

In addition to the efficiency improvements enabled by preheating (or pre-cooling) the gas stored in a compressed-gas reservoir, system efficiency may be enhanced by thermally conditioning gas outside of the cylinder assembly during its transfer to and/or from the cylinder assembly, e.g., during the transfer of gas from and/or to a compressed-gas reservoir, as such transfers may result in temperature changes of the gas outside of the cylinder assembly (e.g., in the reservoir) in the absence of active heat exchange. For example, the gas may be heated or cooled in the compressed-gas reservoir (e.g., reservoir 206 in FIG. 2) and/or in one or more conduits connecting the compressed-gas reservoir with the cylinder assembly (e.g., pipe 240 in FIG. 2). Heating and/or cooling in conduits may be accomplished with heat-transfer subsystems like those described herein for use with compressed-gas reservoirs, e.g., a conduit may be heated and/or cooled from its exterior (or even submerged) and/or may have heat-exchange fluid introduced (e.g., sprayed) therein.

During exemplary compression and expansion cycles in a cylinder assembly, most (up to approximately 90%, or even more) of the compression or expansion of the gas occurs within the cylinder assembly, and the remainder of the compression or expansion generally occurs within the compressed-gas reservoir (and/or a connecting conduit) as the gas is stored or released for the cycle performed within the cylinder assembly. This compression and/or expansion within the reservoir may be substantially isobaric (the pressure change within the reservoir generally depends on the relative volumes of the cylinder assembly and the compressed-gas reservoir and/or the masses of gas therewithin; thus, while some finite change of gas pressure generally occurs, the change may be small when considered over the volume of the typically larger reservoir), but may involve temperature changes of the gas outside of the cylinder assembly (e.g., in the reservoir) in the absence of active heat exchange even if the compression and/or expansion within the cylinder assembly is substantially isothermal. Thus, any of the embodiments described herein for thermal conditioning of gas stored in a compressed-gas reservoir may also or alternatively be utilized to heat or cool gas during transfers into and out of the cylinder assembly. Such thermal conditioning advantageously minimizes or prevents temperature changes within the compressed-gas reservoir during transfer stages, improving total system efficiency. The above-described thermal conditioning outside of the cylinder assembly may be performed in conjunction with lessening or stopping any thermal conditioning being performed inside the cylinder assembly itself during the transfers out of and into the cylinder assembly, as described in the '808 application, as at least a portion of the expansion and/or compression during the transfers may be taking place outside of the cylinder assembly (e.g., within a compressed-gas reservoir).

FIG. 4 is a schematic of an alternative compressed-air pressure vessel subsystem 400 for heating and cooling of compressed gas in energy storage systems, to expedite transfer of thermal energy to and from the compressed gas prior to and/or during expansion or compression. As depicted, thermal energy transfer to and from stored compressed gas in pressure vessels 402, 404 is expedited via water circulation using a water pump 406 and heat exchanger 408. The water pump 406 operates with a small pressure change sufficient for circulation and spray, but within a housing that is able to withstand high pressures. That is, it circulates high-pressure water (or other suitable heat-transfer fluid) through heat exchanger 408 and introduces the water into pressure vessels 402 and 404 without substantially increasing its pressure (e.g., a 100 psi increase for circulating and spraying within 3,000 psi stored compressed air). In this way, the stored compressed air may be pre-heated (or pre-cooled) using a water circulation and spraying pumping method, which also may allow for active water monitoring of the pressure vessels 402 and 404. The spray heat exchange may occur as pre-heating prior to expansion and/or pre-cooling prior to compression in the system 400 when valve 410 is opened. The heat exchanger 408 may be any sort of standard heat exchanger design; illustrated here is a tube-in-shell heat exchanger with high-pressure water inlet and outlet ports 412 and 414 and low-pressure shell water ports 416 and 418. The shell water ports 416 and 418 may permit communication with a second heat exchanger or a thermal well or some other body of fluid. As liquid-to-liquid heat exchangers tend to be more efficient than air-to-liquid heat exchangers, heat-exchanger size may be reduced and/or heat transfer may be improved by use of a liquid-to-liquid exchanger.

Heat exchange within the pressure vessels 402, 404 is expedited by active spraying of liquid (e.g., water) into the vessels 402,404. As illustrated in FIG. 4, perforated spray rods 420 and 422 may be installed within pressure vessels 402 and 404. Water pump 406 increases the water pressure above the vessel pressure such that water is actively circulated and sprayed out of spray rods 420, 422, as shown by arrows 424 and 426. After spraying through the volumes of vessels 402 and 404, water 428, 430 may accumulate at the bottom of the vessels 402, 404 and then be removed through ports 432, 434 and piping 436. The piping 436 returns the water 428, 430 to the heat exchanger 408, through which the water 428, 430 is circulated as part of the closed-loop water circulation and spray system. Valve 410, when open, places the subsystem 400 in fluid communication with an energy-storage system such as system 200 in FIG. 2; in FIG. 2, the gas storage vessel 206 may be replaced by a subsystem such as subsystem 400 in FIG. 4.

The vessels 402, 404 and their internal spray mechanisms 420, 422 are depicted in FIG. 4 in a horizontal position but other orientations are contemplated and within the scope of the invention. Other spray mechanisms (e.g., spray-head type) are also contemplated and within the scope of the invention. Two pressure vessels 402, 404 are depicted in FIG. 4 but other numbers of vessels and other types of gas storage (e.g., natural or artificial caverns) are contemplated and within the scope of the invention.

Figure 5:
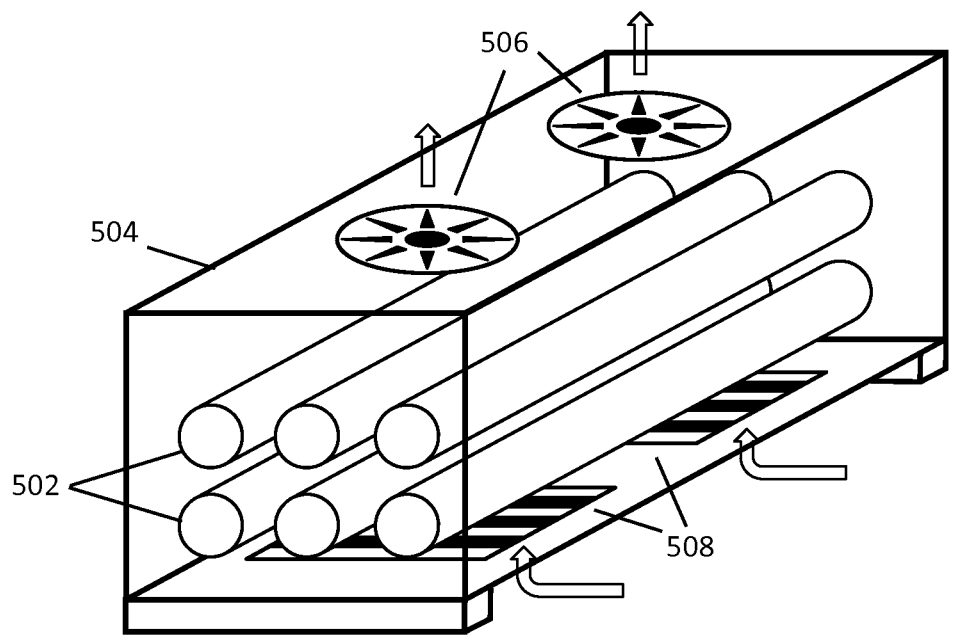
FIG. 5 is a schematic diagram of a compressed-gas storage subsystem for heating and cooling compressed gas in energy-conversion systems via air circulation and air-to-air heat exchange in accordance with various embodiments of the invention.

FIG. 5 is a schematic of an alternative compressed-air pressure vessel subsystem 500 for heating and cooling of compressed gas in energy storage systems, to expedite transfer of thermal energy to and from the compressed gas prior to and/or during expansion or compression. Thermal energy transfer to and/or from stored compressed gas in pressure vessels 502 is expedited via air circulation using an enclosure 504 and air circulation fans 506. In the subsystem 500, air enters the enclosure 504 through vents 508. The air may be at a temperature different from the compressed gas within the vessels 502. The vessels 502 are in an arrangement that permits substantial circulation of air around and between them. Air circulating around and between the vessels 502 gains thermal energy from the vessels 502 if the air entering through the vents 508 is at a lower temperature than the gas within the vessels 502; similarly, the vessels 502 gain thermal energy from the air if the air entering through the vents 508 is at a higher temperature than the gas within the vessels 502. Air that has circulated around and between the vessels 502 is typically pulled from the enclosure 504 by fans 506. The air exhausted by fans 506 may be confined by one or more ducts (not shown), circulated through a heat-exchange system to change its temperature, and returned to the vents 508 through the ducts.

Valves and piping (not shown) may place the contents of the vessels 502 in fluid communication with an energy-storage system such as system 200 in FIG. 2; in FIG. 2, the gas storage vessel 206 may be replaced by a subsystem such as subsystem 500 in FIG. 5. The vessels 502 are depicted in FIG. 5 in a horizontal position but other orientations are contemplated and within the scope of the invention. Six vessels 502 are depicted in FIG. 5 but other numbers of vessels, as well as other types of gas storage (e.g., natural or artificial caverns), are contemplated and within the scope of the invention.

Figure 6:
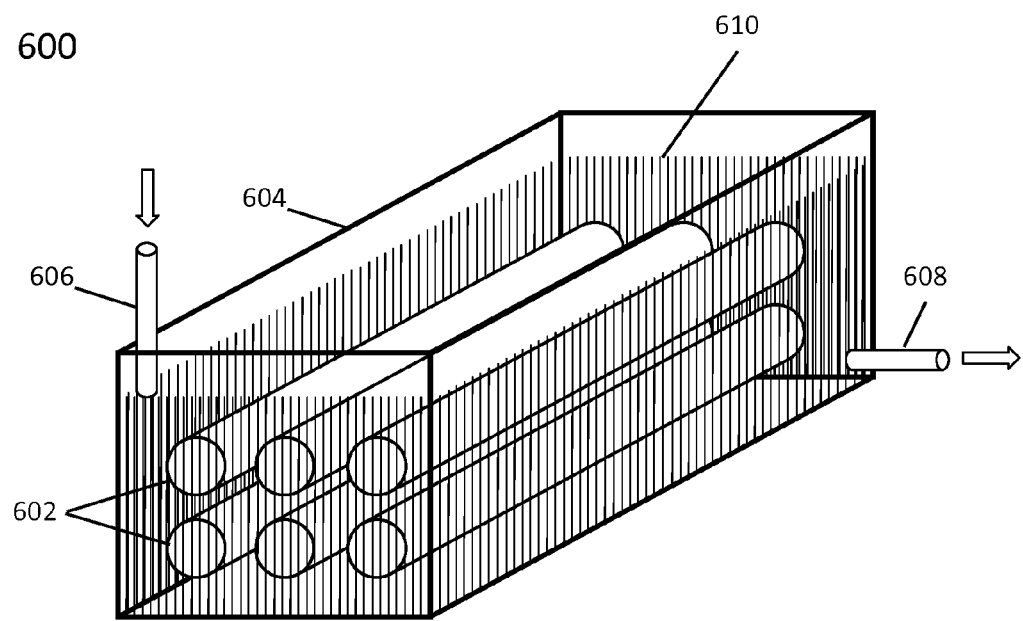
FIG. 6 is a schematic diagram of a compressed-gas storage subsystem for heating and cooling compressed gas in energy-conversion systems via liquid circulation and liquid-to-air heat exchange in accordance with various embodiments of the invention.

FIG. 6 is a schematic of yet another compressed-air pressure vessel subsystem 600 for use with heating and cooling of compressed gas in energy storage systems, to expedite transfer of thermal energy to and from the compressed gas prior to and/or during expansion or compression. Thermal energy transfer to and from stored compressed gas in pressure vessels 602 is expedited via circulation of one or more liquids (e.g., water) in an enclosure 604 and using piping 606, 608 to respectively admit liquid to and remove liquid from the enclosure 604. In the exemplary subsystem 600 depicted in FIG. 6, the liquid level 610 in enclosure 604 is indicated by closely-spaced vertical lines. Liquid enters the enclosure 604 through pipe 606. The liquid may be at a temperature different from that of the compressed gas within the vessels 602. The vessels 602 are preferably in an arrangement that permits substantial circulation of water around and between them. Liquid circulating around and between the vessels 602 gains thermal energy from the vessels 602 if the liquid entering through pipe 606 is at a lower temperature than the gas within the vessels 602; similarly, the vessels 602 gain thermal energy from the liquid if the liquid entering through the pipe 606 is at a higher temperature than the gas within the vessels 602. Liquid that has circulated around and between the vessels 602 is removed from the enclosure through pipe 608. The liquid removed through pipe 608 may be circulated through a heat-exchange system (not shown in FIG. 6) to change its temperature and returned to the enclosure 604 through pipe 606.

Valves and piping (not shown) may place the contents of the vessels 602 in fluid communication with an energy-storage system such as system 200 in FIG. 2; in FIG. 2, the gas storage vessel 206 may be replaced by a subsystem such as subsystem 600 in FIG. 6. The vessels 602 are depicted in FIG. 6 in a horizontal position but other orientations are contemplated and within the scope of the invention. Six vessels 602 are depicted in FIG. 6 but other numbers of vessels are contemplated and within the scope of the invention.

Figure 7:
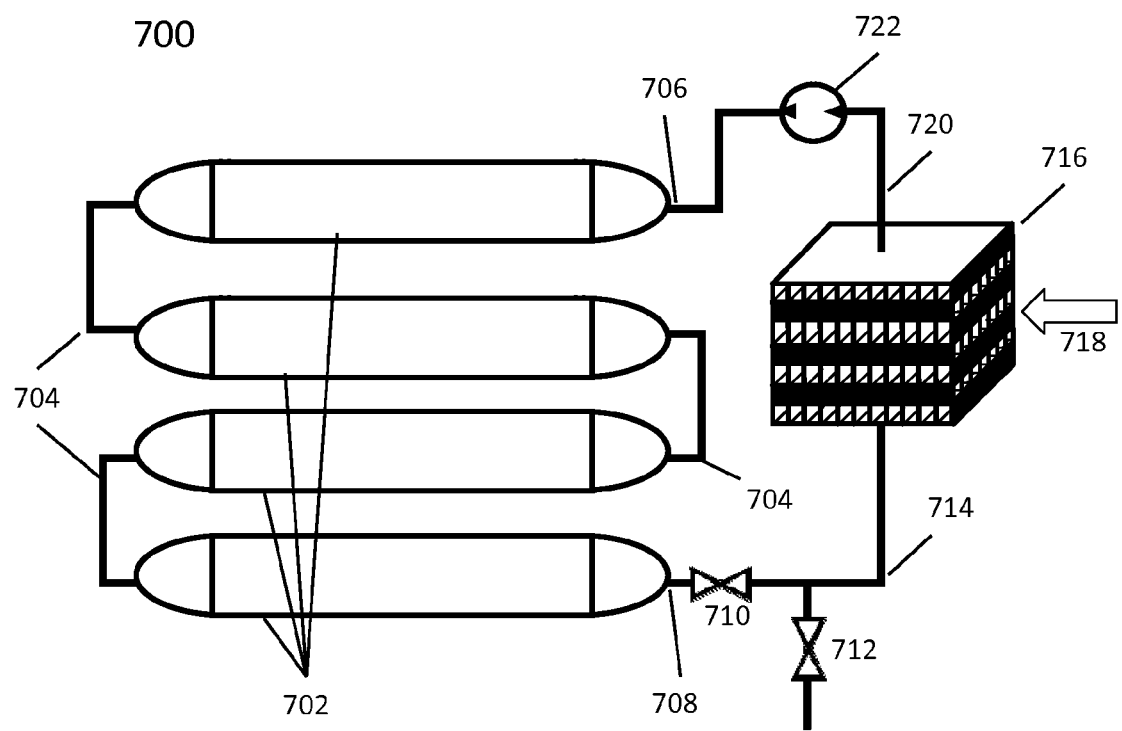
FIG. 7 is a schematic diagram of a compressed-gas storage subsystem for heating and cooling compressed gas in energy-conversion systems via air circulation and air-to-air heat exchange in accordance with various embodiments of the invention.

FIG. 7 depicts a compressed-air pressure vessel subsystem 700 for heating and cooling of compressed gas in energy-storage systems, to expedite transfer of thermal energy to and from the compressed gas prior to and/or during expansion or compression. Thermal energy transfer to and/or from stored compressed gas in pressure vessels 702 is expedited via gas circulation. In the exemplary subsystem 700 depicted in FIG. 7, the vessels 702 are interconnected by piping 704 and, in some embodiments, valves (not shown) so that gas may enter the set of vessels 702 through one port (e.g., port 706), circulate or travel through the set of vessels 702, and exit the set of vessels 702 through a second port (e.g., port 708). The gas may be at any pressure tolerated by the vessels 702 (e.g., between 0 psig and 3,000 psig). If valve 710 is open and valve 712 is closed, gas may flow from port 708, through piping 714, and through an gas-to-gas (e.g., air-to-air) heat exchanger 716. In the heat exchanger 716, air from the vessels 702 exchanges heat with air 718 that may be forced through the heat exchanger 716 by a fan or other circulation mechanism (not shown), raising or lowering the temperature of the air from the vessels 702. The air 718 forced through the heat exchanger 716 may in turn be passed through a second heat-exchange system to regulate its temperature. Gas from the vessels 702 passing through the heat exchanger 716 loses thermal energy if the external air 718 passing through the heat exchanger 716 is at a lower temperature than the gas within the vessels 702; similarly, gas from the vessels 702 passing through the heat exchanger 716 gains thermal energy if the external air 718 passing through the heat exchanger 716 is at a higher temperature than the gas within the vessels 702. Air is drawn from the heat exchanger 716 through piping 720 by an air pump 722 and returned to the vessels 704 through port 706.

Valve 712 may place the contents of the vessels 702 in fluid communication with an energy-storage system such as system 200 in FIG. 2; in FIG. 2, the gas storage vessel 206 may be replaced by a subsystem such as subsystem 700 in FIG. 7. The vessels 702 are depicted in FIG. 7 in a horizontal position but other orientations are contemplated and within the scope of the invention. Four vessels 702 are depicted in FIG. 7 but other numbers of vessels, as well as other types of gas storage (e.g., natural or artificial caverns), are contemplated and within the scope of the invention.

Figure 8:
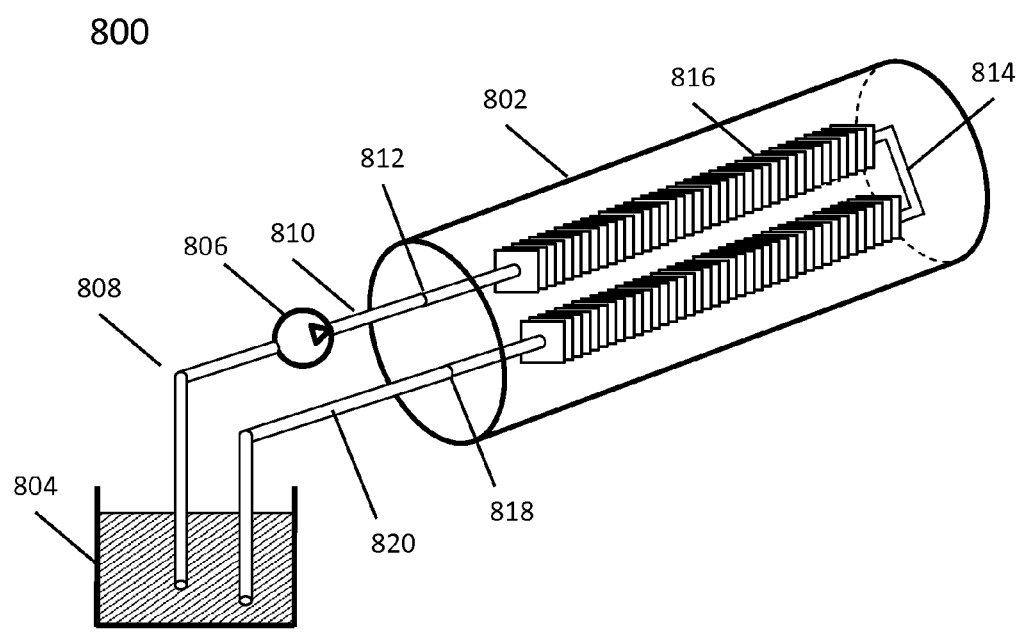
FIGS. 8 and 9 are schematic diagrams of compressed-gas storage subsystems for heating and cooling compressed gas in energy-conversion systems via liquid circulation and liquid-to-air heat exchange in accordance with various embodiments of the invention.

FIG. 8 depicts a compressed-air pressure vessel subsystem 800 for heating and cooling of compressed gas in energy storage systems, to expedite transfer of thermal energy to and from the compressed gas prior to and/or during expansion or compression. Thermal energy transfer to and/or from stored compressed gas in a pressure vessel 802 is expedited via circulation of a liquid (e.g., water). This liquid may be at near atmospheric pressure even when compressed gas within vessel 802 is at super-atmospheric or higher pressures (e.g., 3000 psi). In the exemplary subsystem 800 depicted in FIG. 8, liquid from a thermal reservoir or pool 804, which may be at or near atmospheric pressure, is pulled by a water pump 806 through pipe 808 and pushed through pipe 810 to a port 812 in the end-cap of the vessel 802. Within the vessel 802, water flow from pipe 810 continues through pipe 814, to which are attached heat-exchange fins 816 or other protuberances or contrivances for enhancing heat exchange. Pipe 814 follows a path within vessel 802 that enables gas within the vessel 802 to circulate around the piping 814 and its heat-exchange fins 816. Pipe 814 terminates at a port 818 in the end-cap of the vessel 802. Liquid flow continues from pipe 814 through pipe 820, returning water to the thermal reservoir 804.

Water (or other liquid) enters the storage vessel 802 through pipe 810 and 814. The water may be at a temperature different from the compressed gas within the vessel 802. The piping 814 is arranged to permit substantial heat transfer to the air in the vessel 802. Water circulating in the piping 814 gains thermal energy from the vessel 802 if the water entering through pipes 810 and 814 is at a lower temperature than the gas within the vessel 802; similarly, the gas in the vessel 802 gains thermal energy from the water in pipe 814 if the water entering through the pipes 810 and 814 is at a higher temperature than the gas within the vessel 802. Water that has circulated within the vessel 802 is removed from the enclosure through pipe 820. The water removed through pipe 820 may be circulated through a heat-exchange system (not shown) to change its temperature and returned to the vessel 802 through pipe 810.

Valves and piping (not shown) may place the contents of the vessel 802 in fluid communication with an energy-storage system such as system 200 in FIG. 2; in FIG. 2, the gas storage vessel 206 may be replaced by a subsystem such as subsystem 800 in FIG. 8. The vessel 802 is depicted in FIG. 8 in a horizontal position but other orientations are contemplated and within the scope of the invention. One vessel 802 is depicted in FIG. 8 but other numbers of vessels, as well as other types of gas storage (e.g., natural or artificial caverns), are contemplated and within the scope of the invention.

Figure 9:
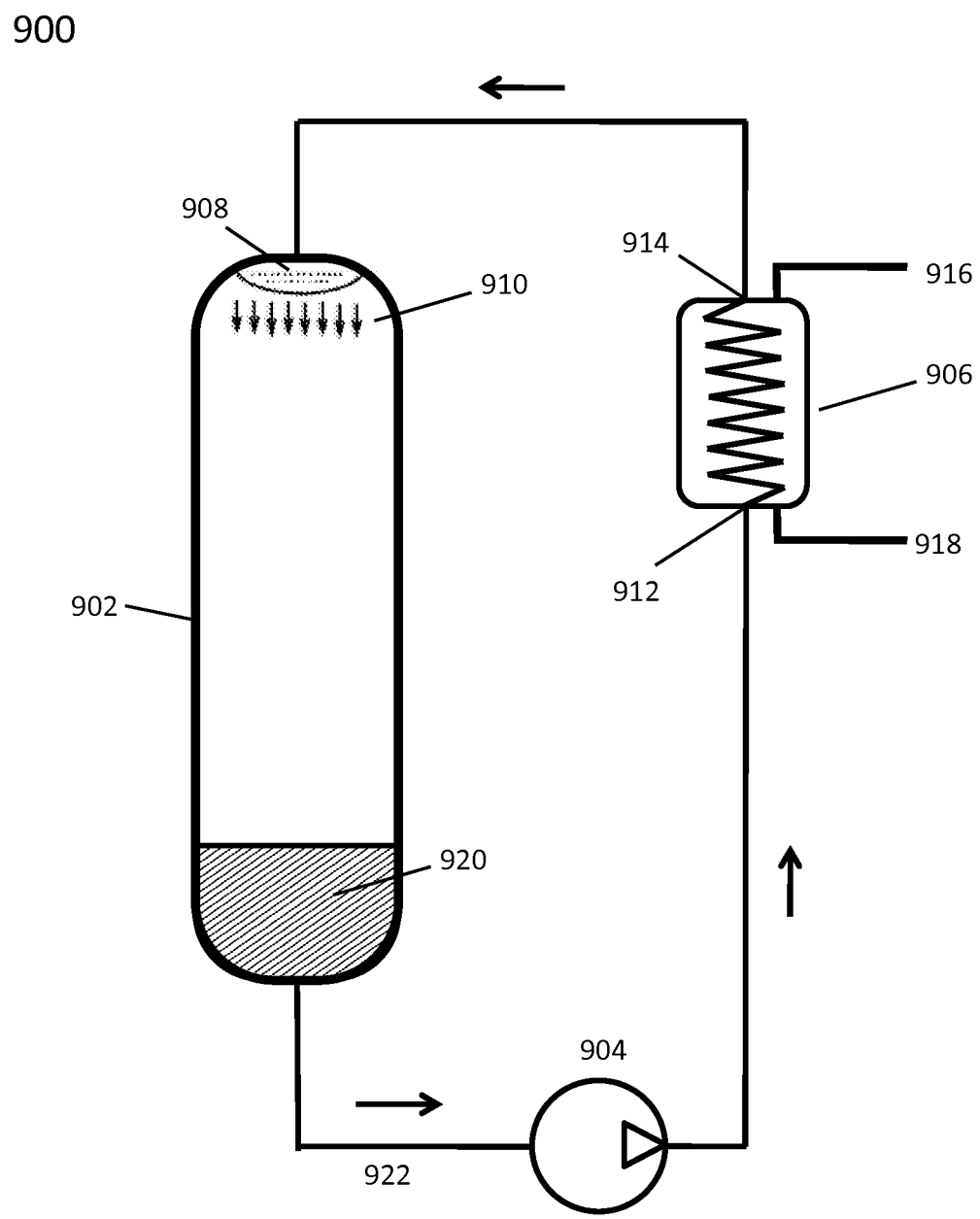

FIG. 9 illustrates another compressed-air pressure vessel subsystem 900 for heating and cooling of compressed gas in energy-storage systems, to expedite transfer of thermal energy to and from the compressed gas prior to and/or during expansion or compression. Thermal energy transfer to and from stored compressed gas in a cavern 902 (e.g., a naturally occurring or artificially created cavern, which may be located underground) is expedited via liquid circulation using a water pump 904 and heat exchanger 906. The water pump 904 operates with a small pressure change sufficient for circulation and spray, but within a housing that is able to withstand high pressures; pump 904 circulates high-pressure water through heat exchanger 906 and then to a spray mechanism 908, creating a spray 910 inside the cavern 902 without substantially increasing the pressure of the liquid (e.g., a 100 psi increase for circulating and spraying within 3,000 psi stored compressed air). In this way, the stored compressed air may be pre-heated (or pre-cooled) using a water circulation and spraying method, which also may allow for active water monitoring of the storage cavern 902. The spray heat exchange may occur as pre-heating prior to expansion and/or pre-cooling prior to compression. The heat exchanger 906 may be of any standard heat exchanger design; illustrated here is a tube-in-shell heat exchanger with high-pressure water inlet and outlet ports 912 and 914 and low-pressure shell water ports 916 and 918. The shell water ports 916 and 918 may permit communication with a second heat exchanger or a thermal well or some other body of fluid. Heat exchange within the storage cavern 902 is expedited by active spraying 910 of liquid (e.g., water) into the cavern 902. Illustrated in FIG. 9 is a scheme where one or more perforated spray heads 908 are installed within the storage cavern 902. Water pump 906 increases the water pressure above the vessel pressure such that water is actively circulated and sprayed out of spray head 908. After spraying through much or all of the volume of cavern 902, water 920 may accumulate at the bottom of the cavern 902 and then be removed through piping 922. The piping 922 returns the water 920 to the pump 904 and heat exchanger 906, through which the water is circulated as part of the closed-loop water circulation and spray system. A valve or valves and piping (not shown) may place the gas-filled portion of cavern 902 in fluid communication with an energy-storage system such as system 200 in FIG. 2; in FIG. 2, the gas storage vessel 206 may be replaced by a subsystem such as subsystem 900 in FIG. 9.

If the cavern 902 is of sufficient size, a substantial mass of water 920 may be allowed to accumulate at the bottom of the cavern 902. In this case, this mass of water 920 may exchange heat relatively slowly with the air also contained in cavern 902, and may be used as a thermal reservoir. A vertical cavern shape and spray-head-type internal spray mechanism 908 are depicted in FIG. 9 but other orientations and spray mechanisms (e.g., spray rod, multiple nozzles) are contemplated and within the scope of the invention. A single cavern 902 is depicted in FIG. 4 but other numbers of caverns and storage volumes comprising caverns and other forms of gas storage (e.g., pressure vessels) are contemplated and within the scope of the invention.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A compressed-gas energy storage and recovery system comprising:
    a first cylinder assembly for at least one of, over a first pressure range, compressing gas to store energy or expanding gas to recover energy, the first cylinder assembly comprising two separated chambers;
    selectively fluidly connected to a chamber of the first cylinder assembly, a vent for admitting ambient air into the chamber of the first cylinder assembly for compression and for exhausting gas from the chamber of the first cylinder assembly after expansion;
    selectively fluidly connected to the first cylinder assembly, a second cylinder assembly for at least one of, over a second pressure range higher than the first pressure range, compressing gas to store energy or expanding gas to recover energy, the second cylinder assembly comprising two separated chambers;
    a first spray mechanism for mingling heat-exchange fluid and gas for at least one of compression or expansion within the second cylinder assembly;
    selectively fluidly connected to a chamber of the second cylinder assembly, a compressed-gas reservoir for storage of gas after compression and supply of compressed gas for expansion, the compressed-gas reservoir comprising an underground cavern; and
    a heat-exchange subsystem for thermally conditioning gas within the compressed-gas reservoir, the heat-exchange subsystem comprising (i) a second spray mechanism disposed within the underground cavern, (ii) a circulation apparatus for extracting liquid from a bottom portion of the underground cavern, and (iii) a conduit selectively fluidly connecting the circulation apparatus and the bottom portion of the underground cavern.

2. The system of claim 1, wherein the heat-exchange subsystem comprises:
    a heat exchanger; and
    a second conduit fluidly connecting the circulation apparatus and the heat exchanger.

3. The system of claim 1, wherein the second spray mechanism comprises at least one of a spray head or a spray rod.

4. The system of claim 1, wherein the heat-exchange fluid comprises water and one or more additives for (i) reducing surface tension of the water and (ii) retarding or preventing corrosion.

5. The system of claim 1, wherein the circulation apparatus comprises a water pump.

6. The system of claim 2, wherein the heat exchanger is in fluid communication with an external heating or cooling source.

7. The system of claim 6, wherein the external heating or cooling source comprises at least one of a fossil fuel power plant, a heat engine power plant, a solar thermal source, a geothermal source, an industrial process with waste heat, a heat pump, a heat source, a heat sink, or a source of environmentally chilled water.

8. The system of claim 6, wherein the external heating or cooling source comprises a thermal well.

9. The system of claim 1, further comprising a movable boundary mechanism separating the two chambers of the first cylinder assembly.

10. The system of claim 9, further comprising, mechanically coupled to the boundary mechanism, a crankshaft for converting reciprocal motion of the boundary mechanism into rotary motion.

11. The system of claim 10, further comprising a motor/generator coupled to the crankshaft.

12. The system of claim 1, wherein the heat-exchange subsystem and the first spray mechanism both utilize the same heat-exchange fluid for heat exchange.

13. The system of claim 1, wherein the first spray mechanism comprises at least one of a spray head or a spray rod.

14. The system of claim 1, further comprising a control system for enforcing at least one of substantially isothermal expansion or substantially isothermal compression within at least one of the first cylinder assembly or the second cylinder assembly.

15. The system of claim 1, wherein the heat-exchange subsystem comprises a heat-transfer fluid incorporating an additive to reduce the surface tension of the heat-transfer fluid.

* * * * *